(12) United States Patent
Hu et al.

(10) Patent No.: US 12,197,828 B2
(45) Date of Patent: Jan. 14, 2025

(54) METHOD AND DEVICE FOR GENERATING WIND TURBINE GENERATOR SET SIMULATION MODEL, EQUIPMENT, AND MEDIUM

(71) Applicant: NORTH CHINA ELECTRIC POWER UNIVERSITY, Beijing (CN)

(72) Inventors: Yang Hu, Beijing (CN); Maofeng Shao, Beijing (CN); Haonan Wang, Beijing (CN); Fang Fang, Beijing (CN); Jizhen Liu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/400,389

(22) Filed: Dec. 29, 2023

(65) Prior Publication Data

US 2024/0281573 A1    Aug. 22, 2024

(30) Foreign Application Priority Data

Feb. 20, 2023    (CN) .......................... 202310147717.8

(51) Int. Cl.
*G06F 30/20*    (2020.01)
*F03D 17/00*    (2016.01)

(52) U.S. Cl.
CPC .............. *G06F 30/20* (2020.01); *F03D 17/00* (2016.05); *F05B 2260/84* (2013.01)

(58) Field of Classification Search
CPC ....... G06F 30/20; F03D 17/00; F05B 2260/84
See application file for complete search history.

(56) References Cited

U.S. PATENT DOCUMENTS

| 2017/0268487 A1 | 9/2017 | Yang et al. |
| 2022/0145856 A1* | 5/2022 | Bezerra Rufino Ferreira Paiva ... G01P 21/025 |
| 2022/0412318 A1* | 12/2022 | Zhao ...................... G08B 21/18 |

FOREIGN PATENT DOCUMENTS

| CN | 108334672 A | 7/2018 |
| CN | 109960823 A | 7/2019 |

(Continued)

OTHER PUBLICATIONS

Fang et al. Application of Gray Relational Analysis to K-<eans Clustering for Dynamic Equivalent Modelign of Wind Farm Internaltioal Journal of Hydrogen Energy 42, 2017 (Year: 2017).*

(Continued)

*Primary Examiner* — Rehana Perveen
*Assistant Examiner* — Cuong V Luu
(74) *Attorney, Agent, or Firm* — MUNCY, GEISSLER, OLDS & LOWE, P.C.

(57) ABSTRACT

A method and device for generating a wind turbine generator set simulation model, equipment and a medium, wherein the method includes: clustering a plurality of pieces of historical operation data of a wind turbine generator set, so as to obtain a predetermined number of target data sets, wherein wind speeds contained in each piece of the historical operation data in a target data set fall within a wind speed range corresponding to the target data set; different target data sets correspond to different wind speed ranges; training an initial simulation model by using each target data set, so as to obtain a segmented pneumatic simulation model corresponding to each target data set; constructing a transmission generation simulation model for a transmission system and a generator system, based on the historical operation data; concatenating the segmented pneumatic simulation model (Continued)

corresponding to each wind speed range and the transmission generation simulation model.

10 Claims, 4 Drawing Sheets

(56) References Cited

FOREIGN PATENT DOCUMENTS

| | | | |
|---|---|---|---|
| CN | 110781574 | A | 2/2020 |
| CN | 113236491 | A | 8/2021 |
| CN | 115186452 | A | 10/2022 |
| WO | WO-2022/001248 | A1 | 1/2022 |

OTHER PUBLICATIONS

Ouyang, Tinghui et al., "Modeling wind-turbine power curve: a data partitioning and mining approach," Renewable Energy, published on line Oct. 18, 2016, Mar. 2017, pp. 1-8, vol. 102, Part A.

Song, Chenguang et al., "Effect of wind speed and airfoil camber on aerodynamic performance of vertical axis wind turbines," Journal of Drainage and Irrigation Machinery Engineering, Mar. 31, 2018, pp. 243-249, vol. 36, Issue No. 3.

Fang, Fang et al., "Digital twin system of a wind turbine," Scientia Sinica (Technologica), published on line Aug. 18, 2021, pp. 1582-1594, vol. 52, Issue No. 10.

* cited by examiner

METHOD AND DEVICE FOR GENERATING WIND TURBINE GENERATOR SET SIMULATION MODEL, EQUIPMENT, AND MEDIUM

TECHNICAL FIELD

The present application relates to the technical field of wind generation, and in particular to a method and device for generating a wind turbine generator set simulation model, related equipment and medium.

BACKGROUND

A wind turbine generator set refers to a device that converts wind energy into electrical energy. Considering that the wind turbine generator set is usually set up in an open field, making it impossible for researchers to have access to a real wind turbine from time to time, in order to facilitate more in-depth research on wind power generation technology, it is usually necessary to establish a turbine simulation mathematical model for a wind turbine generator set in order to simulate a real wind turbine generator set.

In practical applications, when the blades on the wind turbines in the wind turbine generator set capture wind energy, there is a non-linear relationship between the wind speed and the amount of electrical energy ultimately generated by the wind turbine generator set, especially in the wind turbine generator set. In the pneumatic part of the wind turbine generator set, there is a nonlinear relationship between the wind speed and the amount of mechanical energy generated by the pneumatic part.

In the prior art, upon constructing a wind turbine generator set simulation mathematical model for a wind turbine generator set, there is usually a linear relationship between the wind speed in the constructed mathematical model for the wind turbine generator set and the amount of electric energy generated by the wind turbine generator set. Specifically, it is reflected in the linear relationship between the wind speed and the amount of mechanical energy generated by the pneumatic part, resulting in poor accuracy of the mathematical model for wind turbine simulation.

SUMMARY

In view of this, an object of the present application is to provide a method and device for generating a wind turbine generator set simulation model, equipment and a medium, so as to improve the accuracy of the constructed wind turbine generator set simulation mathematical model.

In a first aspect, embodiments of the present application provide a method for generating a wind turbine generator set simulation model, where the wind turbine includes: a pneumatic system with a wind turbine, a transmission system and a generator system; the method includes:

Clustering a plurality of pieces of historical operation data of the wind turbine generator set to obtain a predetermined number of target data sets, where the wind speed contained in each piece of the historical operation data in the target data sets is within wind speed ranges corresponding to the target data sets; different target data sets correspond to different wind speed ranges; and the wind speed ranges corresponding to all the target data sets are continuous;

Training the initial simulation model for the pneumatic system by using each of the target data sets, and fitting the model parameters in the initial simulation model, so as to obtain segmented pneumatic simulation model corresponding to each of the target data sets;

Calculating a hyperplane coefficient in a hyperplane inequality for any two adjacent wind speed ranges based on the two target data sets corresponding to the two adjacent wind speed ranges, where the two segmented pneumatic simulation models corresponding to each two adjacent wind speed ranges correspond to the hyperplane coefficient; and the hyperplane inequality constructed by the hyperplane coefficient is used to select a segmented pneumatic simulation model for use from the two segmented pneumatic simulation models corresponding to two adjacent wind speed ranges;

Based on the historical operation data, constructing a transmission generation simulation model for the transmission system and the generator system; and Concatenating a segmented pneumatic simulation model corresponding to each wind speed range and the transmission generation simulation model, so as to obtain the wind turbine generator set simulation model, corresponding to the each wind speed range.

In conjunction with the first aspect, the embodiments of the present application provide a first possible implementation of the first aspect, where the historical operation data further includes: a wind turbine rotation speed, a generator rotation speed, a pitch angle and a wind turbine pneumatic torque; the step of clustering a plurality of pieces of historical operation data of the wind turbine generator set to obtain a predetermined number of target data sets, including:

Based on a calculation formula of a finite difference regression vector, determining a finite difference regression vector corresponding to each piece of the historical operation data, and determining data points corresponding to the historical operation data based on the finite difference regression vector and the wind turbine pneumatic torque; the calculation formula of the finite difference regression vector is:

$$x(t) = \left[ y^T(t-1) y^T(t-2) \ \ldots \ y^T(t-n) u^T(t-1) u^T(t-2) \ \ldots \ u^T(t-n) \right]$$

Where t represents a generation time of described historical operation data; x(t) is a finite difference regression vector corresponding to a time t; y represents a wind turbine pneumatic torque; u represents the wind speed, the rotor speed, the generator rotation speed and the pitch angle; $n_a$ represents a first delay order of the wind speed, the rotor speed, the generator rotation speed and the pitch angle; $n_b$ represents a second delay order of the wind turbine pneumatic torque.

In conjunction with the first possible implementation of the first aspect, the embodiments of the present application provide a second possible implementation of the first aspect, where the wind turbine generator set is a double-wind turbine generator set, and the pneumatic system includes a first wind turbine and a second wind turbine; the segmented pneumatic simulation model is:

$$y(t) = \begin{bmatrix} y_1(t) \\ y_2(t) \end{bmatrix} = \begin{cases} \begin{bmatrix} \mu_{1,i}^T \\ \mu_{2,i}^T \end{bmatrix} \begin{bmatrix} x(t) \\ 1 \end{bmatrix} \\ \ldots \end{cases}$$

Where i represents the $i^{th}$ segmented pneumatic simulation model, y(t) represents the wind turbine pneumatic torque in the historical operation data corresponding to the time t, and y1(t) represents the wind turbine pneumatic torque of the first wind turbine, $y_2(t)$ represents the wind turbine pneumatic torque of the second wind turbine, $\mu_{1,i}$ represents model parameters corresponding to the pneumatic torque of the first wind turbine of the it segmented pneumatic simulation model, $\mu_{2,i}$ represents model parameters corresponding to the wind turbine pneumatic torque of the second wind turbine of the $i^{th}$ segmented pneumatic simulation model, and x(t) represents the finite difference regression vector corresponding to the historical operation data corresponding to the time t.

In conjunction with the first possible implementation of the first aspect, the embodiments of the present application provide a third possible implementation of the first aspect, where the step of calculating the hyperplane coefficient in the hyperplane inequality for any two adjacent wind speed ranges based on the two target data sets corresponding to the two adjacent wind speed ranges including:

Calculating a hyperplane coefficient in a hyperplane inequality by the following equation:

$$\min\left(\frac{1}{2}\varphi^T\varphi + \gamma\sum_{k=1}^{m}\xi_k\right)$$

A constraint condition is:

$$b_k(\varphi^T x_k + d) \geq 1 - \xi_k, \xi_k \geq 0, k = 1, 2, \ldots, m$$

Where $\psi$ is a normal vector, d is an offset, and the hyperplane coefficient includes the normal vector and the offset; $\gamma$ represents apenaltycoefficient; $\xi_k$ represents a slack variable; m represents the number of historical operation data contained in the two target data sets corresponding to the two adjacent wind speed ranges; $x_k$ represents the finite difference regression vector corresponding to the $k^{th}$ historical operation data in the two target data sets corresponding to the two adjacent wind speed ranges; $b_k$ represents a data set label of the target data set to which the $k^{th}$ historical operation data belongs.

In conjunction with the first possible implementation of the first aspect, the embodiments of the present application provide a fourth possible implementation of the first aspect, where the historical operation data further includes: a generator electromagnetic torque, where the transmission simulation model for the transmission system is:

$$\begin{cases} T_r = J_r\omega_r + T_{shaft} \\ T_{shaft} = A_{stif}\left(\delta_r - \frac{\delta_g}{N}\right) + B_{damp}\left(\omega_r - \frac{\omega_g}{N}\right) \\ -T_g = J_g\omega_g - \frac{T_{shaft}}{N} \end{cases}$$

Where $T_r$ represents a wind turbine pneumatic torque, $T_g$ represents a generator electromagnetic torque, $\omega_r$ represents a wind turbine rotation speed, $\omega_g$ represents a generator rotation speed, $T_{shaft}$ represents an equivalent intermediate shaft torque, and $J_r$ represents a wind turbine rotational inertia, $J_g$ represents a generator rotational inertia, $\delta_r$ is a wind turbine angular displacement, $\delta_g$ is an angular displacement of the generator, $d(\delta_r)/dt=\omega_r$, $d(\delta_g)/dt=\omega_g$, N represents a transmission ratio of a gearbox in the transmission system, $A_{stif}$ represents an equivalent stiffness coefficient of an intermediate shaft, and $B_{damp}$ represents an equivalent damping coefficient of the intermediate shaft;

The generation simulation model for the generator system is:

$$\dot{T}_g = \frac{1}{\tau_g}(T_g^* - T_g)$$

Where $T_g^*$ is a generator electromagnetic torque reference value, $\tau_g$ is an equivalent time constant, and $T_g$ is the generator electromagnetic torque;

The transmission generation simulation model is:

$$\begin{pmatrix}\dot{\omega}_r \\ \dot{\omega}_g \\ \dot{\delta}_p \\ \dot{T}_g\end{pmatrix} = \begin{bmatrix}\frac{-B_{damp}}{J_r} & \frac{B_{damp}}{J_rN} & -\frac{A_{stif}}{J_r} & \frac{1}{J_r} \\ \frac{B_{damp}}{J_gN} & \frac{-B_{damp}}{J_gN^2} & \frac{A_{stif}}{J_gN} & 0 \\ 1 & -\frac{1}{N} & 0 & 0 \\ 0 & 0 & 0 & -\frac{1}{\tau_g}\end{bmatrix}\begin{pmatrix}\omega_r \\ \omega_g \\ \delta_p \\ T_g\end{pmatrix} +$$

$$\begin{bmatrix}\frac{1}{J_r} & 0 & 0 \\ 0 & -\frac{1}{J_g} & 0 \\ 0 & 0 & 0 \\ 0 & 0 & \frac{1}{\tau_g}\end{bmatrix}\begin{pmatrix}T_r \\ T_g \\ T_g^*\end{pmatrix}$$

$$\begin{pmatrix}\omega_r \\ T_{shift}\end{pmatrix} = \begin{bmatrix}1 & 0 & 0 & 0 \\ B_{damp} & \frac{-B_{damp}}{N} & A_{stif} & 0\end{bmatrix}\begin{pmatrix}\omega_r \\ \omega_g \\ \delta_p \\ T_g\end{pmatrix}$$

$$\delta_p = \delta_r - \frac{\delta_g}{N}$$

The wind turbine generator set simulation model is:

$$M_i: \begin{cases} h(t+1) = Dh(t) + Hs(t) \\ f(t) = Rh(t) + Gs(t) \end{cases}$$

$$D = \begin{bmatrix}\frac{-B_{damp}}{J_r} & \frac{B_{damp}}{J_rN} & -\frac{A_{stif}}{J_r} & \frac{\alpha_1}{J_r} \\ \frac{B_{damp}}{J_gN} & \frac{-B_{damp}}{J_gN^2} & \frac{A_{stif}}{J_gN} & 0 \\ 1 & -\frac{1}{N} & 0 & 0 \\ 0 & 0 & 0 & -\frac{1}{\tau_g}\end{bmatrix}$$

$$H = \begin{bmatrix}\frac{\alpha_2}{J_r} & \frac{\alpha_3}{J_r} & \frac{\alpha_4}{J_r} & \frac{\alpha_5}{J_r} & \frac{\alpha_6}{J_r} & \frac{\alpha_7}{J_r} & \frac{\alpha_8}{J_r} & \frac{\alpha_9}{J_r} & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & \square & 0 & \frac{1}{\tau_g}\end{bmatrix}$$

$$R = \begin{bmatrix}1 & 0 & 0 & 0 \\ B_{damp} & \frac{-B_{damp}}{N} & A_{stif} & 0\end{bmatrix}$$

Where $M_i$ represents the $i^{th}$ wind turbine generator set simulation model; h(t) represents the wind speed, the generator rotation speed, the generator electromagnetic torque and $\delta_p$ at time t, s(t) represents the wind speed, the wind turbine rotation speed and the generator rotation speed, the pitch angle and the generator electromagnetic torque reference value, corresponding to the third delay order at the time t, f(t) represents the wind turbine rotation speed and the equivalent intermediate shaft torque at the time t; and $\alpha_1$-$\alpha_9$ represents the model parameters of the wind turbine generator set simulation model; G=0.

In conjunction with the first aspect, the embodiments of the present application provide a fifth possible implementation of the first aspect, where after acquiring the wind turbine generator set simulation model corresponding to each of the wind speed ranges, the method further includes:

Acquiring a first current wind turbine rotation speed when the wind turbine generator set simulation model runs;

Determining whether the first current wind turbine rotation speed is greater than the predetermined wind turbine rotation speed, and querying the first target generator electromagnetic torque corresponding to the first current wind turbine rotation speed from the predetermined speed and torque curve table;

When the first current wind turbine rotation speed is greater than the predetermined wind turbine rotation speed, based on the target generator electromagnetic torque, adjusting the pitch angle of the wind turbine generator set simulation model, so that the current generator electromagnetic torque of the wind turbine generator set simulation model is remained within an allowable variation range of a rated generator electromagnetic torque;

When the first current wind turbine rotation speed is less than or equal to the predetermined wind turbine rotation speed, based on the target generator electromagnetic torque, adjusting the pitch angle of the wind turbine generator set simulation model to 0, so that the current generator electromagnetic torque of the wind turbine generator set simulation model reaches the target generator electromagnetic torque; the target generator electromagnetic torque is less than the rated generator electromagnetic torque.

In conjunction with the fifth possible implementation of the first aspect, the embodiments of the present application provide a sixth possible implementation of the first aspect, where after acquiring the wind turbine generator set simulation model corresponding to each of the wind speed ranges, the method further includes:

Acquiring the current wind speed, the second current wind turbine rotation speed, the current generator rotation speed, the current pitch angle, and the current generator electromagnetic torque at the current time when the wind turbine generator set simulation model runs;

Querying the second target generator electromagnetic torque corresponding to the second current wind turbine rotation speed, from the rotation speed and torque curve table;

Predicting the generator electromagnetic torque of the wind turbine generator set simulation model at the next time after the current time based on the second target generator electromagnetic torque, the current wind speed at the current time, the second current wind turbine rotation speed, the current generator rotation speed, the current pitch angle, and the current generator electromagnetic torque.

In a second aspect, embodiments of the present application also provide a device for generating a wind turbine generator set simulation model, where the wind turbine generator set includes: a pneumatic system with wind turbines, a transmission system and a generator system; the device includes:

A clustering module, configured to cluster a plurality of pieces of historical operation data of the wind turbine generator set to obtain a predetermined number of target data sets, wherein wind speeds contained in each piece of the historical operation data in a target data set fall within a wind speed range corresponding to the target data set; different target data sets correspond to different wind speed ranges; and the wind speed ranges corresponding to all the target data sets are continuous;

A fitting module, configured to train the initial simulation model for the pneumatic system, by using each of the target data sets, and to fit the model parameters in the initial simulation model, so as to acquire a segmented pneumatic simulation model corresponding to each of the target data sets;

A calculation module, configured to calculate a hyperplane coefficient in a hyperplane inequality for any two adjacent wind speed ranges based on the two adjacent target data sets corresponding to the two adjacent wind speed ranges, where the two segmented pneumatic simulation models corresponding to each two adjacent wind speed ranges correspond to the hyperplane coefficient; and the hyperplane inequality constructed by the hyperplane coefficient is used to select a segmented pneumatic simulation model for use from the two segmented pneumatic simulation models corresponding to two adjacent wind speed ranges;

A construction module, configured to construct a transmission generation simulation model for the transmission system and the generator system based on the historical operation data; and A concatenating module, configured to concatenate the segmented pneumatic simulation model corresponding to each wind speed range and the transmission generation simulation model to obtain a wind turbine generator set simulation model corresponding to the each wind speed range.

In conjunction with the second aspect, embodiments of the present application provides a first possible implementation of the second aspect, where the historical operation data further includes: a wind turbine rotation speed, a generator rotation speed, a pitch angle and a wind turbine pneumatic torque; when the clustering module is configured to cluster the plurality of pieces of historical operation data of the wind turbine generator set to obtain a predetermined number of target data sets, it is specifically configured to:

Based on the calculation formula of the finite difference regression vector, determine a finite difference regression vector corresponding to each piece of the historical operation data, and determine data points corresponding to the historical operation data based on the finite difference regression vector and the wind turbine pneumatic torque; the calculation formula of the finite difference regression vector is:

$$x(t) = \left[ y^T(t-1) y^T(t-2) \ldots y^T(t-n) u^T(t-1) u^T(t-2) \ldots u^T(t-n) \right]$$

Where t represents a generation time of the historical operation data; x(t) is a finite difference regression vector corresponding to a time t; y represents a wind turbine pneumatic torque; u represents the wind speed, the rotor speed, the generator rotation speed and the pitch angle; $n_a$ represents a first delay order of the wind speed, the rotor speed, the generator rotation speed and the pitch angle; and $n_b$ represents a second delay order of the wind turbine pneumatic torque;

Divide the plurality of pieces of historical operation data according to the Euclidean distance between any two data points to obtain a plurality of initial data sets;

Calculate a parameter vector for each of the initial data sets using the least squares method;

Determine a mean value of the finite difference regression vector corresponding to each piece of the historical operation data in each of the initial data sets;

Generate a eigenvector corresponding to the initial data set for each initial data set according to the mean value and the parameter vector corresponding to the initial data set;

Calculate an empirical covariance matrix for each of the eigenvectors, and separately calculate a dispersion matrix used to represent the dispersion of each of the initial data sets;

Determine a confidence degree of the eigenvector according to the empirical covariance matrix and the dispersion matrix corresponding to the eigenvector;

Cluster a plurality of eigenvectors using a K-means clustering algorithm based on the confidence degree, the dispersion matrix and the empirical covariance matrix corresponding to each eigenvector, determine the clustering results of the historical operation data according to the clustering results of the eigenvector, so as to obtain a predetermined number of the target data sets.

In conjunction with the first possible implementation of the second aspect, the embodiments of the present application provide a second possible implementation of the second aspect, where the wind turbine generator set is a double-wind turbine generator set, and the pneumatic system includes a first wind turbine and a second wind turbine; the segmented pneumatic simulation model is:

$$y(t) = \begin{bmatrix} y_1(t) \\ y_2(t) \end{bmatrix} = \left\{ \begin{array}{c} \cdots \\ \begin{bmatrix} \mu_{1,i}^T \\ \mu_{2,i}^T \end{bmatrix} \begin{bmatrix} x(t) \\ 1 \end{bmatrix} \\ \cdots \end{array} \right.$$

Where i represents the $i^{th}$ segmented pneumatic simulation model, y(t) represents the wind turbine pneumatic torque in the historical operation data corresponding to the time t, and y1(t) represents the wind turbine pneumatic torque of the first wind turbine, $y_2(t)$ represents the wind turbine pneumatic torque of the second wind turbine, $\mu_{1,i}$ represents model parameters corresponding to the pneumatic torque of the first wind turbine of the $i^{th}$ segmented pneumatic simulation model, $\mu_{2,i}$ represents model parameters corresponding to the wind turbine pneumatic torque of the second wind turbine of the $i^{th}$ segmented pneumatic simulation model, and x(t) represents the finite difference regression vector corresponding to the historical operation data corresponding to the time t.

In conjunction with the first possible implementation of the second aspect, the embodiments of the present application provide a third possible implementation of the second aspect, where when the calculation module is configured to calculate the hyperplane coefficient in the hyperplane inequality for any two adjacent wind speed ranges based on the two target data sets corresponding to the two adjacent wind speed ranges, it is specifically configured to:

Calculate the hyperplane coefficient in the hyperplane inequality by the following equation:

$$\min\left(\frac{1}{2}\varphi^T\varphi + \gamma \sum_{k=1}^{m} \xi_k\right)$$

A constraint condition is:

$$b_k(\varphi^T x_k + d) \geq 1 - \xi_k, \xi_k \geq 0, k = 1, 2, \ldots, m$$

Where $\psi$ is a normal vector, d is an offset, and the hyperplane coefficient includes the normal vector and the offset; $\gamma$ represents a penalty coefficient; $\xi_k$ represents a slack variable; m represents the number of historical operation data contained in the two target data sets corresponding to the two adjacent wind speed ranges; $x_k$ represents a finite difference regression vector corresponding to the $k^{th}$ historical operation data in the two target data sets corresponding to the two adjacent wind speed ranges; and $b_k$ represents a data set label of the target data set to which the $k^{th}$ historical operation data belongs.

In conjunction with the first possible implementation of the second aspect, the embodiments of the present application provide a fourth possible implementation of the second aspect, where the historical operation data further includes: a generator electromagnetic torque, where the transmission simulation model for the transmission system is:

$$\begin{cases} T_r = J_r \omega_r + T_{shaft} \\ T_{shaft} = A_{stif}\left(\delta_r - \frac{\delta_g}{N}\right) + B_{damp}\left(\omega_r - \frac{\omega_g}{N}\right) \\ -T_g = J_g \omega_g - \frac{T_{shaft}}{N} \end{cases}$$

Where $T_r$ represents a wind turbine pneumatic torque, $T_g$ represents a generator electromagnetic torque, $\omega_r$ represents a wind turbine rotation speed, $\omega_g$ represents a generator rotation speed, $T_{shaft}$ represents an equivalent intermediate shaft torque, $J_r$ represents a wind turbine rotational inertia, $J_g$ represents a generator rotational inertia, $\delta_r$ is a wind turbine angular displacement, $\delta_g$ is an angular displacement of the generator, $d(\delta_r)/dt=\omega_r$, $d(\delta_g)/dt=\omega_g$, N represents a transmission ratio of a gearbox in the transmission system, $A_{stif}$ represents an equivalent stiffness coefficient of an intermediate shaft, and $B_{damp}$ represents an equivalent damping coefficient of the intermediate shaft;

The generation simulation model for the generator system is:

$$\dot{T}_g = \frac{1}{\tau_g}(T_g^* - T_g)$$

Where $T_g^*$ is a generator electromagnetic torque reference value, $\tau_g$ is an equivalent time constant, and $T_g$ is the generator electromagnetic torque;

The transmission generation simulation model is:

$$\begin{pmatrix}\dot\omega_r\\\dot\omega_g\\\dot\delta_p\\\dot T_g\end{pmatrix}=\begin{bmatrix}\frac{-B_{damp}}{J_r}&\frac{B_{damp}}{J_r}&-\frac{A_{stif}}{J_r}&\frac{1}{J_r}\\\frac{B_{damp}}{J_gN}&\frac{-B_{damp}}{J_gN^2}&\frac{A_{stif}}{J_gN}&0\\1&-\frac{1}{N}&0&0\\0&0&0&-\frac{1}{\tau_g}\end{bmatrix}\begin{pmatrix}\omega_r\\\omega_g\\\delta_p\\T_g\end{pmatrix}+$$

$$\begin{bmatrix}\frac{1}{J_r}&0&0\\0&-\frac{1}{J_g}&0\\0&0&0\\0&0&\frac{1}{\tau_g}\end{bmatrix}\begin{pmatrix}T_r\\T_g\\T_g^*\end{pmatrix}$$

$$\begin{pmatrix}\omega_r\\T_{shaft}\end{pmatrix}=\begin{bmatrix}1&0&0&0\\B_{damp}&\frac{-B_{damp}}{N}&A_{stif}&0\end{bmatrix}\begin{pmatrix}\omega_r\\\omega_g\\\delta_p\\T_g\end{pmatrix}$$

$$\delta_p=\delta_r-\frac{\delta_g}{N}$$

The wind turbine generator set simulation model is:

$$M_i:\begin{cases}h(t+1)=Dh(t)+Hs(t)\\f(t)=Rh(t)+Gs(t)\end{cases}$$

$$D=\begin{bmatrix}\frac{-B_{damp}}{J_r}&\frac{B_{damp}}{J_rN}&-\frac{A_{stif}}{J_r}&\frac{\alpha_1}{J_r}\\\frac{B_{damp}}{J_gN}&\frac{-B_{damp}}{J_gN^2}&\frac{A_{stif}}{J_gN}&0\\1&-\frac{1}{N}&0&0\\0&0&0&-\frac{1}{\tau_g}\end{bmatrix}$$

$$H=\begin{bmatrix}\frac{\alpha_2}{J_r}&\frac{\alpha_3}{J_r}&\frac{\alpha_4}{J_r}&\frac{\alpha_5}{J_r}&\frac{\alpha_6}{J_r}&\frac{\alpha_7}{J_r}&\frac{\alpha_8}{J_r}&\frac{\alpha_9}{J_r}&0\\0&0&0&0&0&0&0&0&0\\0&0&0&0&0&0&0&0&0\\0&0&0&0&0&0&0&0&\frac{1}{\tau_g}\end{bmatrix}$$

$$R=\begin{bmatrix}1&0&0&0\\B_{damp}&\frac{-B_{damp}}{N}&A_{stif}&0\end{bmatrix}$$

Where $M_i$ represents the $i^{th}$ wind turbine generator set simulation model; h(t) represents the wind speed, the wind turbine rotation speed, the generator rotation speed, the generator electromagnetic torque and δp at the time t, s(t) represents the wind speed, wind turbine rotation speed, the generator rotation speed, the pitch angle and the generator electromagnetic torque reference value corresponding to the third delay order at time t, f(t) represents the wind turbine rotation speed and the equivalent intermediate shaft torque at the time t; and $\alpha_1$-$\alpha_9$ represents the model parameters of the wind turbine generator set simulation model; G=0.

In conjunction with the second aspect, the embodiments of the present application provide a fifth possible implementation of the second aspect, where the device further includes:

A first acquisition module, configured to acquire the first current wind turbine rotation speed of the wind turbine generator set simulation model during simulation run after the concatenating module obtains the wind turbine generator set simulation model corresponding to each of the wind speed ranges;

A judgment module, configured to judge whether the first current wind turbine rotation speed is greater than the predetermined wind turbine rotation speed, and to query the first target generator electromagnetic torque corresponding to the first current wind turbine rotation speed from the predetermined speed and torque curve table;

A first adjustment module, configured to adjust the pitch angle of the wind turbine generator set simulation model based on the target generator electromagnetic torque when the first current wind turbine rotation speed is greater than the predetermined wind turbine rotation speed, so as to remain the current generator electromagnetic torque of the wind turbine generator set simulation model within an allowable variation range of a rated generator electromagnetic torque; and A second adjustment module, configured to adjust the pitch angle of the wind turbine generator set simulation model based on the target generator electromagnetic torque when the first current wind turbine rotation speed is less than or equal to the predetermined wind turbine rotation speed, so that the current generator electromagnetic torque of the wind turbine generator set simulation model reaches the target generator electromagnetic torque; and the target generator electromagnetic torque is less than the rated generator electromagnetic torque.

In conjunction with the fifth possible implementation of the second aspect, embodiments of the present application provide a sixth possible implementation of the second aspect, where the device further includes:

A second acquisition module, configured to acquire the current wind speed, the second current wind turbine rotation speed, the current generator rotation speed, the current pitch angle, and the current generator electromagnetic torque of the wind turbine generator set simulation model at the current time during simulation run after the concatenating module obtains the wind turbine generator set simulation model corresponding to each of the wind speed ranges;

A query module, configured to query the second target generator electromagnetic torque corresponding to the second current wind turbine rotation speed from the speed torque curve table; and A prediction module, configured to predict the generator electromagnetic torque of the wind turbine generator set simulation model at the next time after the current time based on the second target generator electromagnetic torque, the current wind speed at the current time, the second current wind turbine rotation speed, the current generator rotation speed, the current pitch angle, and the current generator electromagnetic torque.

In a third aspect, embodiments of the present application further provide electronic equipment, including: a processor, a memory and a bus. The memory stores machine-readable instructions executable by the processor. When the electronic equipment is running, the processor and the memory communicate through the bus. When the machine-readable instructions are executed by the processor, the steps in any possible implementation of the first aspect are performed.

In a fourth aspect, embodiments of the present application also provide a computer-readable storage medium, a computer program is stored therein, when run by a processor, the computer program performing the steps of the method in any possible implementation mode in the first aspect.

Embodiments of the present application provide a method and device for generating a wind turbine generator set simulation model, equipment and a medium. Upon constructing a wind turbine generator set simulation model, historical operation data are clustered to obtain a predetermined number. After acquiring the target data sets, each target data set is used to train the initial simulation model for the pneumatic system respectively, and acquire the segmented pneumatic simulation model corresponding to each target data set. Since different target data sets correspond to different wind speed ranges, the wind speed ranges corresponding to all the target data sets are continuous. Therefore, the applicable wind speed range of each segmented pneumatic simulation model is different. Within a wind speed range (for example, 3 m/s-8 m/s, 8 m/s-11 m/s), there is a linear relationship between the wind speed and the amount of mechanical energy generated by the pneumatic system. However, in the entire continuous wind speed range (including all wind speed ranges, such as 3 m/s-24 m/s), the wind speed has a linear relationship with the mechanical energy generated by the pneumatic system. There is a nonlinear relationship between the numbers, which improves the accuracy of the segmented pneumatic simulation model, and thus improves the accuracy of the wind turbine generator set simulation mathematical model.

In order to make the above-mentioned objects, features and advantages of the present application more obvious and understandable, preferred embodiments are given below and described in detail with reference to the attached drawings.

BRIEF DESCRIPTION OF THE DRAWINGS

In order to more clearly illustrate the technical solutions of the embodiments of the present application, the following will briefly introduce the accompanying drawings to be used in the embodiments, and it should be understood that the following accompanying drawings only show certain embodiments of the present application, and therefore should not be regarded as a limitation of the scope, and those of ordinary skill in the art can further obtain other relevant drawings according to these drawings without making creative efforts.

DETAILED DESCRIPTION

Figure 1:
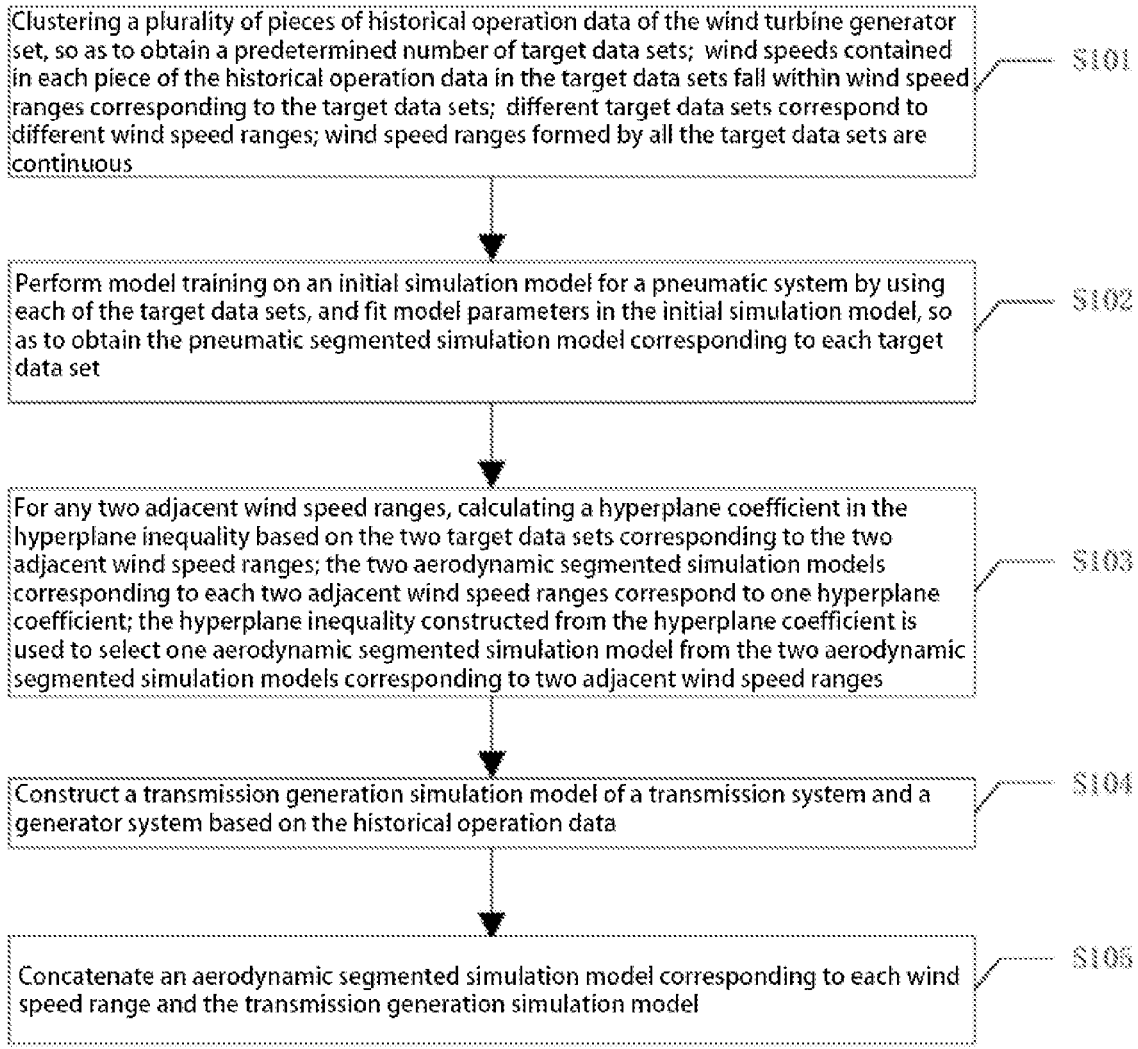
FIG. 1 illustrates a flowchart of a method for generating a wind turbine generator set simulation model provided by an embodiment of the present application.

In order to make the objects, technical solutions and advantages of the embodiments of the present application clearer, the technical solutions in the embodiments of the present application will be clearly and completely described below in conjunction with the accompanying drawings in the embodiments of the present application, and it is clear that the described embodiments are only a part of the embodiments of the present application rather than all of the embodiments. The components of embodiments of the present application generally described and illustrated in the accompanying drawings herein may be arranged and designed in a variety of different configurations. Accordingly, the following detailed description of embodiments of the present application provided in the accompanying drawings is not intended to limit the scope of the present application for which protection is claimed, but rather represents only selected embodiments of the present application. Based on the embodiments of the present application, all other embodiments obtained by those skilled in the art without making creative efforts are within the scope of protection of the present application.

A wind turbine generator set refers to a device that converts wind energy into electrical energy, and the wind turbine generator set mainly includes three components: a pneumatic part, a transmission part, and a generator part. Among them, the pneumatic part is mainly used to convert wind energy into mechanical energy, specifically, the pneumatic part mainly includes a wind turbine, and the blades on the wind turbine will drive the wind turbine to rotate according to the captured wind energy, thereby converting the wind energy into mechanical energy. The transmission part is mainly used to amplify the mechanical energy, specifically, the transmission part is mainly composed of a gear box, a large gear in the gear box is connected to the wind turbine, the large gear will rotate according to the rotation speed of the wind turbine, and a pinion in the gear box will rotate according to the driving of the large gear, and since the rotation speed of the pinion is larger than the rotation speed of the large gear (e.g., when the gear ratio of the large gear to the pinion in the gear box is 1:10, the large gear will rotate one revolution when the pinion rotates one revolution. (For example, when the transmission ratio of the large gear to the small gear in the gearbox is 1:10, the large gear rotates 10 times when the small gear rotates once), so the mechanical energy converted from wind energy can be amplified by the transmission part. The generator portion is mainly used to convert mechanical energy into electrical energy, specifically, the generator is connected to the pinion gear, which will rotate the generator to produce electrical energy.

In practice, when the blades on the wind turbine capture the wind energy, there is a non-linear relationship between the magnitude of the wind speed and the amount of electrical energy ultimately generated by the wind turbine generator set, and in particular the pneumatic part of the wind turbine generator set, where the magnitude of the wind speed and the amount of mechanical energy generated by the pneumatic part are non-linearly related.

Considering that wind turbine generator set is usually set up in an open field, making it impossible for researchers to have access to real wind turbine generator set from time to time, there is a need to establish a wind turbine generator set simulation mathematical model in order to facilitate more in-depth research on wind power generation technology, so as to simulate a real wind turbine generator set for researchers to carry out research.

In the prior art, in establishing a wind turbine generator set simulation mathematical model, the relationship between the size of the wind speed and the amount of electrical energy produced by the wind turbine generator set is usually linear in the established wind turbine generator set simulation mathematical model, which is specifically reflected in the relationship between the size of the wind speed and the amount of mechanical energy produced by the pneumatic part, which leads to a poorer accuracy of the established wind turbine generator set simulation mathematical model.

In consideration of the above problems, based on this, the embodiments of the present application provide a method and device for generating a wind turbine generator set simulation model, equipment and a medium, so as to improve the accuracy of the constructed wind turbine generator set simulation mathematical model. Description will be made with the following examples.

Embodiment I

In order to facilitate understanding of this embodiment, a method for generating a wind turbine generator set simulation model disclosed in the embodiment of the present application is first introduced in detail. The wind turbine generator set includes: a pneumatic system with wind turbines, a transmission system and a generator system. FIG. 1 shows a flow chart of a method for generating a wind turbine generator set simulation model provided by the embodiment of the present application. As shown in FIG. 1, it includes the following steps S101-S105:

S101: clustering a plurality of pieces of historical operation data of the wind turbine generator set, so as to obtain a predetermined number of target data sets, wherein wind speeds contained in each piece of the historical operation data in a target data set fall within a wind speed range corresponding to the target data set; different target data sets correspond to different wind speed ranges; and the wind speed ranges corresponding to all the target data sets are continuous.

In this embodiment, the wind turbine generator set includes a single-wind turbine generator set and/or a double-wind turbine generator set, where the double-wind turbine generator set is specifically a horizontal-axis counter-rotating double-wind turbine generator set.

The pneumatic system in the wind turbine generator set mainly includes wind turbines. The blades on the wind turbines will drive the wind turbines to rotate according to the captured wind energy, thereby converting wind energy into mechanical energy. In other words, the pneumatic system is mainly used to convert wind energy into mechanical energy. The transmission system is mainly composed of a gear box. The large gear in the gear box is connected to the wind turbines. The large gear will rotate following the speed of the wind turbines. The small gear in the gear box will rotate according to the drive of the large gear. Since the speed of the small gear is greater than the speed of the large gear (for example, when the transmission ratio of the large gear to the pinion in the gearbox is 1:10, the big gear rotates once, the small gear rotates 10 times), so the mechanical energy converted from wind energy can be amplified through the transmission system. The generator system is mainly used to convert mechanical energy into electrical energy. Specifically, the generator is connected to a pinion, and the pinion drives the generator to rotate, thereby generating electrical energy.

Historical operation data includes: a wind speed, a wind turbine rotation speed, a generator rotation speed, a pitch angle, a wind turbine pneumatic torque and a generator electromagnetic torque. When the wind turbine generator set is a double-wind turbine generator set, the wind turbine generator set includes: a first pneumatic system including the first wind turbine, a second pneumatic system including the second wind turbine, a first transmission system, a second transmission system, a first generator system and a second generator system. At this time, historical operation data includes: a first wind speed corresponding to the first wind turbine, a first wind turbine rotation speed and a first pitch angle, a first generator electromagnetic torque corresponding to the first generator system, and a second wind speed corresponding to the second wind turbine, a second wind turbine rotation speed and a second pitch angle, and a second generator electromagnetic torque corresponding to the second generator system.

Figure 2:
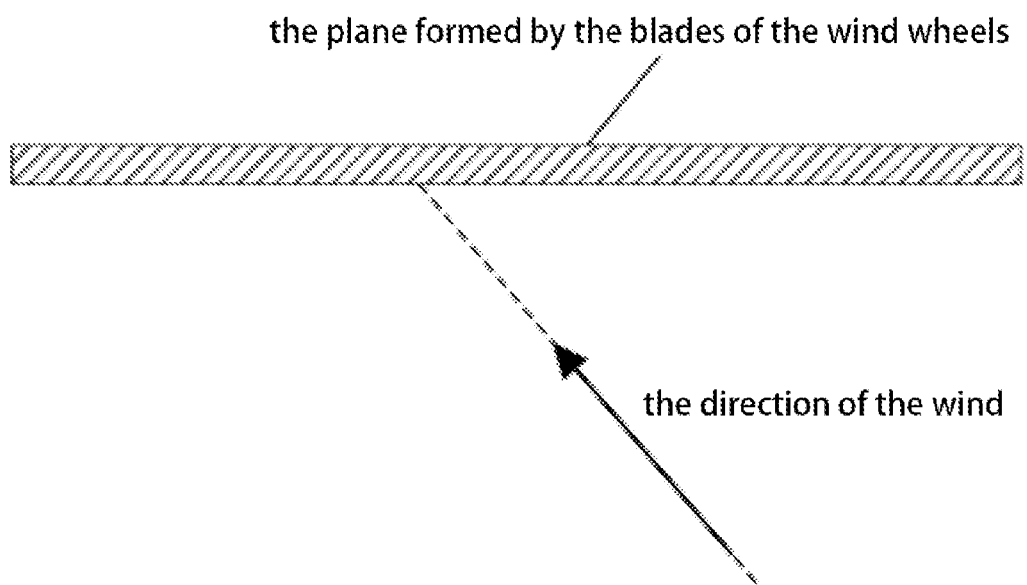
FIG. 2 illustrates a schematic diagram of a pitch angle provided by an embodiment of the present application.

FIG. 2 shows a schematic diagram of a pitch angle provided by the embodiment of the present application. As shown in FIG. 2, the angle between the direction of the wind and the plane formed by the blades of the wind turbines is the corresponding pitch of the wind turbines. Specifically, when the direction of the wind is perpendicular to the plane formed by the blades of the wind turbines, the pitch angle is 90 degrees; and when the direction of the wind is parallel to the plane formed by the blades of the wind turbines, the pitch angle is 0 degree. The smaller the pitch angle is, the higher the wind energy utilization rate is.

There are a plurality of pieces of historical operation data, and each historical time corresponds to a piece of historical operation data. Each of the target data sets contains the plurality of pieces of historical operation data.

For example, if the predetermined number is 5, and the wind speed range corresponding to all target data sets is 3 m/s-24 m/s, at this time, there are 5 target data sets and 5 wind speed ranges. Specifically they are 3 m/s-6 m/s, 6 m/s-9 m/s, 9 m/s-15 m/s, 15 m/s-20 m/s, 20 m/s-24 m/s. Then, all the wind speeds in the historical operation data contained in the target data sets corresponding to the wind speed range of 3 m/s-6 m/s are within the range of 3 m/s-6 m/s. There is a one-to-one correspondence between the target data set and the wind speed range. Two adjacent wind speed ranges (for example: 9 m/s-15 m/s, 15 m/s-20 m/s), except for the boundary value of the wind speed range (15 m/s at this time), other wind speed ranges do not overlap.

In a possible implementation, when performing step S101, the following steps S1011-S1018 can be performed:

S1011: based on a calculation formula of a finite difference regression vector, the finite difference regression vector corresponding to respective historical operation data is determined, and data points corresponding to the historical operation data are determined based on the finite difference regression vector and the wind turbine pneumatic torque; the calculation formula of the finite difference regression vector is:

$$x(t) = [y^T(t-1) y^T(t-2) \ldots y^T(t-n) u^T(t-1) u^T(t-2) \ldots u^T(t-n)]$$

Where t represents a generation time of historical operation data; x(t) is the finite difference regression vector corresponding to a time t; y represents the wind turbine pneumatic torque; u represents the wind speed, the wind turbine rotation speed, the generator rotation speed and the pitch angle; $n_a$ represents a first delay order of the wind speed, the rotor speed, the generator rotation speed and the pitch angle; and $n_b$ represents a second delay order of the wind turbine pneumatic torque.

In this embodiment, each piece of historical operation data corresponds to its respective finite difference regression vector. t represents the generation time of historical operation data, t−1 represents a first time before the generation time, and t−$n_a$ represents a first delay order time before the generation time. The delay order represents the delay time, that is, the $n_a$ time before t.

For each of historical operation data, the data points (x(t), y(t)) corresponding to the historical operation data are generated based on the finite difference regression vector and the wind turbine pneumatic torque corresponding to the historical operation data. x(t) is the finite difference regression vector, and y(t) is the wind turbine pneumatic torque.

S1012: According to the Euclidean distance between any two data points, a plurality of pieces of historical operation data are divided to obtain a plurality of initial data sets.

The plurality of historical operation data is divided according to the Euclidean distance between any two data points to obtain a plurality of initial data sets. Each initial data set includes the plurality of historical operation data. The Euclidean distance between two historical operation data in the same initial data set is less than the Euclidean distance between historical operation data in that initial data set and historical operation data in other data sets.

S1013: The parameter vector for each initial data set is calculated using the least squares method.

Specifically, the parameter vector of each initial data set is calculated through the following equations:

$$PV_c = (Z_c^T Z_c)^{-1} Z_c^T [y_{c,1}, y_{c,2}, \ldots, y_{c,k}]$$

$$Z_c^T = \begin{bmatrix} x_{c1}(t) & \cdots & x_{ck}(t) \\ 1 & \cdots & 1 \end{bmatrix}$$

Where $PV_c$ represents a parameter vector corresponding to the $c^{th}$ initial data set, and each initial data set corresponds to a parameter vector; $y_{c,1}$ represents the wind turbine pneumatic torque in the first historical operation data in the $c^{th}$ initial data set; $y_{c,k}$ represents the wind turbine pneumatic torque in the $k^{th}$ historical operation data in the $c^{th}$ initial data set; there are a total of k historical operation data in the $c^{th}$ initial data set; $x_{c1}(t)$ represents the finite difference regression vector corresponding to the first piece of historical operation data in the $c^{th}$ initial data set; and $x_{ck}(t)$ represents the finite difference regression vector corresponding to the $k^{th}$ historical operation data in the $c^{th}$ initial data set.

S1014: a mean value of the finite difference regression vector corresponding to each historical operation data in each initial data set is determined.

S1015: an eigenvector corresponding to the initial data set for each initial data set is generated based on the mean value and parameter vector corresponding to the initial data set.

The eigenvector is:

$$FV_c = [(PV_c)^T M_c]^T$$

Where $F_{Vc}$ represents the eigenvector corresponding to the $c^{th}$ initial data set, and $M_c$ represents the mean of all finite difference regression vectors in the $c^{th}$ initial data set. In this embodiment, each initial data set corresponds to an eigenvector.

S1016: an empirical covariance matrix is calculated for each eigenvector, and a dispersion matrix representing the dispersion of each initial data set is calculated separately.

Each eigenvector corresponds to an empirical covariance matrix, that is, each initial data set corresponds to an empirical covariance matrix. In this embodiment, the empirical covariance matrix of the eigenvector can be calculated specifically through the following equations:

$$V_c = \frac{y_c^T (1 - Z_c (Z_c^T Z_c)^{-1} Z_c^T) y_c}{n_c - (n_e + 1)} (Z_c^T Z_c)^{-1}$$

$$Z_c = \begin{bmatrix} x_{c1}(t) & \cdots & x_{ck}(t) \\ 1 & \cdots & 1 \end{bmatrix}^T$$

Where $V_c$ represents the empirical covariance matrix corresponding to the $c^{th}$ initial data set ($c^{th}$ eigenvector); $y_c$ represents the wind turbine pneumatic torque in respective historical operation data comprised in the $c^{th}$ initial data set; i is the identity matrix; $x_{c1}(t)$ represents the finite difference regression vector corresponding to the first historical operation data in the $c^{th}$ initial data set; $x_{ck}(t)$ represents the finite difference regression vector corresponding to the $k^{th}$ historical operation data in the $c^{th}$ initial data set; $n_e$ represents the dimension of the finite difference regression vector; and $n_c$ represents the number of initial data sets.

Each initial data set corresponds to a dispersion matrix. In this embodiment, the dispersion matrix corresponding to each initial data set can be calculated using the following equation:

$$Q_c = \sum_{x_k \in c} (x_k - M_c)^T (x_k - M_c)$$

Where $Q_c$ represents the dispersion matrix corresponding to the $c^{th}$ initial data set; c represents the $c^{th}$ initial data set; $x_k$ represents the finite difference regression vector corresponding to the $k^{th}$ historical operation data in the initial data set; and $M_c$ represents the mean corresponding to the $c^{th}$ initial data set.

S1017: according to the empirical covariance matrix and dispersion matrix corresponding to the eigenvector, the confidence of the eigenvector is determined.

The eigenvector is regarded as a random vector obeying Gaussian distribution, then the covariance matrix corresponding to the eigenvector is:

$$R_c = \begin{bmatrix} V_c & 0 \\ 0 & Q_c \end{bmatrix}$$

Where $R_c$ represents a covariance matrix corresponding to the eigenvector corresponding to the $c^{th}$ initial data set; $V_c$ represents the empirical covariance matrix corresponding to the c-th initial data set; $Q_c$ represents the dispersion matrix corresponding to the $c^{th}$ initial data set.

The confidence of the eigenvector is calculated by the following equation:

$$\beta_c = \frac{1}{\sqrt{(2\pi)^{2n_e+1} \det(R_c)}}$$

Where $\beta_c$ represents a confidence of the eigenvector corresponding to the $c^{th}$ initial data set; $R_c$ represents the covariance matrix of the eigenvector corresponding to the $c^{th}$ initial data set; and $n_e$ represents the dimension of the finite difference regression vector.

S1018: the K-means clustering algorithm (K-Means algorithm) is used to cluster a plurality of eigenvectors based on the confidence, the dispersion matrix and the empirical covariance matrix corresponding to each eigenvector to determine the clustering results of the eigenvectors. The clustering results of historical operation data are used to obtain a predetermined number of target data sets.

In this embodiment, the plurality of eigenvectors are clustered to divide the eigenvector clusters into S data clusters, and the corresponding initial data sets are also divided into S groups, that is, S groups of target data sets are obtained. Each target data set contains historical operation data from a plurality of initial data sets.

S102: model training is performed on an initial simulation model for a pneumatic system by using each of the target data sets, and the model parameters are fit in the initial simulation model, so as to obtain the segmented pneumatic simulation model corresponding to each target data set.

In this embodiment, the initial simulation model corresponding to each target data set is the same. For example, it is assumed that there are two target data sets, respectively target data set 1 and target data set 2, then the application uses the target data set 1 to train the initial simulation model, and to fit the model parameters in the initial simulation model so as to acquire the segmented pneumatic simulation model 1 corresponding to the target data set 1. Similarly, the target data set 2 is used to train the initial simulation model, and to fit the model parameters in the initial simulation model, so as to acquire the segmented pneumatic simulation model 2 corresponding to the target data set 2.

In this embodiment, when the initial simulation model is trained, since the target data sets used are different, the model parameters in the segmented pneumatic simulation models corresponding to different target data sets may be different, and each target data set corresponds to a segmented pneumatic simulation model.

Following the example in step S101, it is assumed that there are 5 target data sets and 5 wind speed ranges. The specific assumptions are as follows: 3 m/s-6 m/s, 6 m/s-9 m/s, 9 m/s-15 m/s, 15 m/s-20 m/s, 20 m/s-24 m/s. Then these 5 target data sets are used to train the initial simulation model, 5 segmented pneumatic simulation models can obtained. The applicable wind speed ranges of these 5 segmented pneumatic simulation models are different, specifically: 3 m/s-6 m/s, 6 m/s-9 m/s, 9 m/s-15 m/s, 15 m/s-20 m/s, 20 m/s-24 m/s.

In a possible implementation, the wind turbine generator set is a double-wind turbine generator set, and the pneumatic system includes a first wind turbine and a second wind turbine; the segmented pneumatic simulation model is:

$$y(t) = \begin{bmatrix} y_1(t) \\ y_2(t) \end{bmatrix} = \left\{ \begin{matrix} \cdots \\ \begin{bmatrix} \mu_{1,i}^T \\ \mu_{2,i}^T \end{bmatrix} \begin{bmatrix} x(t) \\ 1 \end{bmatrix} \\ \cdots \end{matrix} \right.$$

Where i represents the $i^{th}$ segmented pneumatic simulation model, y(t) represents the wind turbine pneumatic torque in the historical operation data corresponding to the time t, and y1(t) represents the wind turbine pneumatic torque of the first wind turbine, $y_2(t)$ represents the wind turbine pneumatic torque of the second wind turbine, $\mu_{1,i}$ represents model parameters corresponding to the pneumatic torque of the first wind turbine of the $i^{th}$ segmented pneumatic simulation model, $\mu_{2,i}$ represents model parameters corresponding to the wind turbine pneumatic torque of the second wind turbine of the $i^{th}$ segmented pneumatic simulation model, and x(t) represents the finite difference regression vector corresponding to the historical operation data corresponding to the time t.

S103: a hyperplane coefficient in a hyperplane inequality for any two adjacent wind speed ranges is calculated based on the two target data sets corresponding to the two adjacent wind speed ranges; the two segmented pneumatic simulation models corresponding to each two adjacent wind speed ranges correspond to the hyperplane coefficient; the hyperplane inequality constructed by the hyperplane coefficient is used to select a segmented pneumatic simulation model from the two segmented pneumatic simulation models corresponding to two adjacent wind speed ranges. The segmented pneumatic simulation model is configured to determine the wind turbine pneumatic torque based on the wind speed, the wind turbine rotation speed, the generator rotation speed and the pitch angle.

Following the above embodiment, when there are 5 target data sets and 5 wind speed ranges, the wind speed ranges are specifically: 3 m/s-6 m/s, 6 m/s-9 m/s, 9 m/s-15 m/s, 15 m/s-20 m/s, 20 m/s-24 m/s, at this time, the wind speed ranges applicable to the 5 segmented pneumatic simulation models are specifically as follows: 3 m/s-6 m/s, 6 m/s-9 m/s, 9 m/s-15 m/s, 15 m/s-20 m/s, 20 m/s-24 m/s. For the wind speed at the critical point of the wind speed range (for example, 6 m/s), it is needed to determine whether the segmented pneumatic simulation model corresponding to 3 m/s-6 m/s or the segmented pneumatic model corresponding to 6 m/s-9 m/s are used, so in the present application, which segmented pneumatic simulation model is used to determine the wind turbine pneumatic torque corresponding to the wind speed can be determined in the following way.

In a possible implementation, calculating a hyperplane coefficient in the hyperplane inequality for any two adjacent wind speed ranges based on the two target data sets corresponding to the two adjacent wind speed ranges includes:

Calculating the hyperplane coefficient in the hyperplane inequality by the following equation:

$$\min\left(\frac{1}{2}\varphi^T\varphi + \gamma\sum_{k=1}^{m}\xi_k\right)$$

A constraint condition is:

$$b_k(\varphi^T x_k + d) \geq 1 - \xi_k, \xi_k \geq 0, k = 1, 2, \ldots, m$$

Where $\psi$ is a normal vector, d is an offset, and the hyperplane coefficient includes the normal vector and the offset; $\gamma$ represents a penalty coefficient; $\xi_k$ represents a slack variable; m represents the number of the historical operation data contained in the two target data sets corresponding to the two adjacent wind speed ranges; $x_k$ represents a finite difference regression vector corresponding the $k^{th}$ historical operation data in the two target data sets corresponding to the two adjacent wind speed ranges; and $b_k$ represents a data set label of the target data set to which the $k^{th}$ historical operation data belongs.

In this embodiment, 3 m/s-6 m/s and 6 m/s-9 m/s are two adjacent wind speed ranges, 6 m/s-9 m/s and 9 m/s-15 m/s are two adjacent wind speed ranges. Two adjacent wind speed ranges correspond to the hyperplane inequality, i.e., the wind speed ranges of 3 m/s-6 m/s and 6 m/s-9 m/s correspond to the hyperplane inequality. When there are 5 wind speed ranges, there are 4 hyperplane inequalities. Specifically, one side of the hyperplane inequality is 0 and the other side is:

$$\varphi^T x' + d$$

In this embodiment, the hyperplane inequality corresponding to the wind speed range of 3 m/s-6 m/s and 6 m/s-9 m/s is used as an example for explanation: after the hyperplane coefficient and d in the hyperplane inequality corresponding to the wind speed range of 3 m/s-6 m/s and 6 m/s-9 m/s are determined, and after the wind speed, the wind turbine rotation speed, the generator rotation speed and the pitch angle needed to be inputted are determined, the finite difference regression vector x' used to represent the inputted wind speed, rotor speed, generator rotation speed and pitch angle are determined. x' is inputted into the above inequality to judge the relationship between $\varphi^T_x'+d$ and 0. If $\varphi^T_x'+d$ is less than 0, it means the segmented pneumatic simulation model corresponding to the wind speed range of 3 m/s to 6 m/s needs to be used to determine the wind turbine pneumatic torque; if $\varphi^T_x'+d$ is greater than 0, it means that the segmented pneumatic simulation model corresponding to the wind speed range of 6 m/s-9 m/s needs to be used to determine the wind turbine pneumatic torque.

S104: a transmission generation simulation model for a transmission system and a generator system is constructed based on the historical operation data.

In a possible implementation, historical operation data further includes: a generator electromagnetic torque, where the transmission simulation model for the transmission system is:

$$\begin{cases} T_r = J_r \omega_r + T_{shaft} \\ T_{shaft} = A_{stif}\left(\delta_r - \frac{\delta_g}{N}\right) + B_{damp}\left(\omega_r - \frac{\omega_g}{N}\right) \\ -T_g = J_g \omega_g - \frac{T_{shaft}}{N} \end{cases}$$

Where $T_r$ represents the wind turbine pneumatic torque, $T_g$ represents the generator electromagnetic torque, $\omega_r$ represents the wind turbine rotation speed, $\omega_g$ represents the generator rotation speed, $T_{shaft}$ represents an equivalent intermediate shaft torque, $J_r$ represents a wind turbine rotational inertia, $J_g$ represents a generator rotational inertia, $\delta_r$ is a wind turbine angular displacement, $\delta_g$ is an angular displacement of the generator, $d(\delta_r)/dt=\omega_r$, $d(\delta_g)/dt=\omega_g$, N represents a transmission ratio of a gearbox in the transmission system, $A_{stif}$ represents an equivalent stiffness coefficient of an intermediate shaft, and $B_{damp}$ represents an equivalent damping coefficient of the intermediate shaft;

The generation simulation model for the generator system is:

$$\dot{T}_g = \frac{1}{\tau_g}(T_g^* - T_g)$$

Where $T_g^*$ is a generator electromagnetic torque reference value, $\tau_g$ is an equivalent time constant, and $T_g$ is the generator electromagnetic torque;

The transmission generation simulation model is configured to determine the generator electromagnetic torque based on the wind turbine pneumatic torque. The transmission generation simulation model is:

$$\begin{pmatrix} \dot{\omega}_r \\ \dot{\omega}_g \\ \dot{\delta}_p \\ \dot{T}_g \end{pmatrix} = \begin{bmatrix} -\frac{B_{damp}}{J_r} & \frac{B_{damp}}{J_r} & -\frac{A_{stif}}{J_r} & \frac{1}{J_r} \\ \frac{B_{damp}}{J_g N} & -\frac{B_{damp}}{J_g N^2} & \frac{A_{stif}}{J_g N} & 0 \\ 1 & -\frac{1}{N} & 0 & 0 \\ 0 & 0 & 0 & -\frac{1}{\tau_g} \end{bmatrix} \begin{pmatrix} \omega_r \\ \omega_g \\ \delta_p \\ T_g \end{pmatrix} +$$

$$\begin{bmatrix} \frac{1}{J_r} & 0 & 0 \\ 0 & -\frac{1}{J_g} & 0 \\ 0 & 0 & 0 \\ 0 & 0 & \frac{1}{\tau_g} \end{bmatrix} \begin{pmatrix} T_r \\ T_g \\ T_g^* \end{pmatrix}$$

$$\begin{pmatrix} \omega_r \\ T_{shaft} \end{pmatrix} = \begin{bmatrix} 1 & 0 & 0 & 0 \\ B_{damp} & -\frac{B_{damp}}{N} & A_{stif} & 0 \end{bmatrix} \begin{pmatrix} \omega_r \\ \omega_g \\ \delta_p \\ T_g \end{pmatrix}$$

$$\delta_p = \delta_r - \frac{\delta_g}{N}$$

S105: a segmented pneumatic simulation model corresponding to each wind speed range and the transmission generation simulation model are concatenated, so as to acquire the wind turbine generator set simulation model corresponding to the wind speed range.

The wind turbine generator set simulation model is configured to determine the generator electromagnetic torque based on the wind speed, the wind turbine rotation speed, the generator rotation speed, and the pitch angle, and the generator electromagnetic torque is used to characterize the generation of wind power. Each wind speed range corresponds to the wind turbine generator set simulation model. The segmented pneumatic simulation models are different in different wind turbine generator set simulation models. The wind turbine generator set simulation model is:

$$M_i: \begin{cases} h(t+1) = Dh(t) + Hs(t) \\ f(t) = Rh(t) + Gs(t) \end{cases}$$

$$D = \begin{bmatrix} -\frac{B_{damp}}{J_r} & \frac{B_{damp}}{J_r N} & -\frac{A_{stif}}{J_r} & \frac{\alpha_1}{J_r} \\ \frac{B_{damp}}{J_g N} & -\frac{B_{damp}}{J_g N^2} & \frac{A_{stif}}{J_g N} & 0 \\ 1 & -\frac{1}{N} & 0 & 0 \\ 0 & 0 & 0 & -\frac{1}{\tau_g} \end{bmatrix}$$

$$H = \begin{bmatrix} \frac{\alpha_2}{J_r} & \frac{\alpha_3}{J_r} & \frac{\alpha_4}{J_r} & \frac{\alpha_5}{J_r} & \frac{\alpha_6}{J_r} & \frac{\alpha_7}{J_r} & \frac{\alpha_8}{J_r} & \frac{\alpha_9}{J_r} & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & \frac{1}{\tau_g} \end{bmatrix}$$

$$R = \begin{bmatrix} 1 & 0 & 0 & 0 \\ B_{damp} & -\frac{B_{damp}}{N} & A_{stif} & 0 \end{bmatrix}$$

Where $M_i$ represents the $i^{th}$ wind turbine generator set simulation model; h(t) represents the wind speed, the wind turbine rotation speed, the generator rotation speed, the generator electromagnetic torque and δp at the time t, s(t) represents the wind speed, the wind turbine rotation speed, the generator rotation speed, the pitch angle and the generator electromagnetic torque reference value corresponding to the third delay order at the time t, f(t) represents the wind turbine rotation speed and equivalent intermediate shaft torque at the time t; and $α_1$-$α_9$ represents model parameters of the wind turbine generator set simulation model; G=0.

In a possible implementation, after the wind turbine generator set simulation model corresponding to each wind speed range is acquired, the following steps S1061-S1064 can be performed:

S1061: the first current wind turbine rotation speed is acquired when the wind turbine generator set simulation model performs simulating run.

In this embodiment, when the wind turbine generator set simulation model is a dual-wind turbine generator set simulation model, the first current rotor speed comprises the current wind turbine speed of the first wind turbine and the current wind turbine speed of the second wind turbine.

The simulation run refers to inputting the predetermined wind speed, wind turbine rotation speed, generator rotation speed and pitch angle into the wind turbine generator set simulation model, so that the wind turbine generator set simulation model outputs the corresponding generator electromagnetic torque to predict generation.

S1062: whether the first current wind turbine rotation speed is greater than the predetermined wind turbine rotation speed is determined, and the first target generator electromagnetic torque corresponding to the first current wind turbine rotation speed is queried from the predetermined speed and torque curve table.

The speed and torque curve table pre-contains the target generator electromagnetic torque corresponding to each wind turbine rotation speed.

S1063: when the first current wind turbine rotation speed is greater than the predetermined wind turbine rotation speed, based on the target generator electromagnetic torque, the pitch angle of the wind turbine generator set simulation model is adjusted, so that the current generator electromagnetic torque of the wind turbine generator set simulation model is remained within an allowable variation range of a rated generator electromagnetic torque.

In this embodiment, the greater the first current wind turbine rotation speed is, the greater the current wind speed is. At this time, the pitch angle of the wind turbine generator set simulation model is adjusted to become larger, less wind energy is absorbed, and the wind turbine generator set simulation model is controlled to be remained near the rated power to generate electricity. Specifically, the current generator electromagnetic torque is controlled to be remained near the rated generator electromagnetic torque, thereby controlling the wind turbine generator set simulation model to be remained near the rated power to generate electricity.

S1064: when the first current wind turbine rotation speed is less than or equal to the predetermined wind turbine rotation speed, based on the target generator electromagnetic torque, the pitch angle of the wind turbine generator set simulation model is adjusted to 0, so that the current generator electromagnetic torque of the wind turbine generator set simulation model reaches the target generator electromagnetic torque; the target generator electromagnetic torque is less than the rated generator electromagnetic torque.

In this embodiment, the smaller the first current wind turbine rotation speed is, the smaller the current wind speed is. At this time, the pitch angle of the wind turbine generator set simulation model is adjusted to 0, so that the current generator electromagnetic torque of the wind turbine generator set simulation model reaches the target generator electromagnetic torque, thereby increasing the generation of the wind turbine generator set simulation model.

In a possible implementation, after the wind turbine generator set simulation model corresponding to each wind speed range is acquired, the following steps S1071-S1073 can be performed:

S1071: the current wind speed, the second current wind turbine rotation speed, the current generator rotation speed, the current pitch angle, and the current generator electromagnetic torque at the current time are acquired when the wind turbine generator set simulation model runs.

S1072: the second target generator electromagnetic torque corresponding to the second current wind turbine rotation speed is queried from the speed and torque curve table.

The speed and torque curve table pre-contains the target generator electromagnetic torque corresponding to each wind turbine rotation speed.

S1073: the generator electromagnetic torque of the wind turbine generator set simulation model at the next time after the current time is predicted based on the second target generator electromagnetic torque, the current wind speed at the current time, the second current wind turbine rotation speed, the current generator rotation speed, the current pitch angle, and the current generator electromagnetic torque.

Embodiment II

Figure 3:
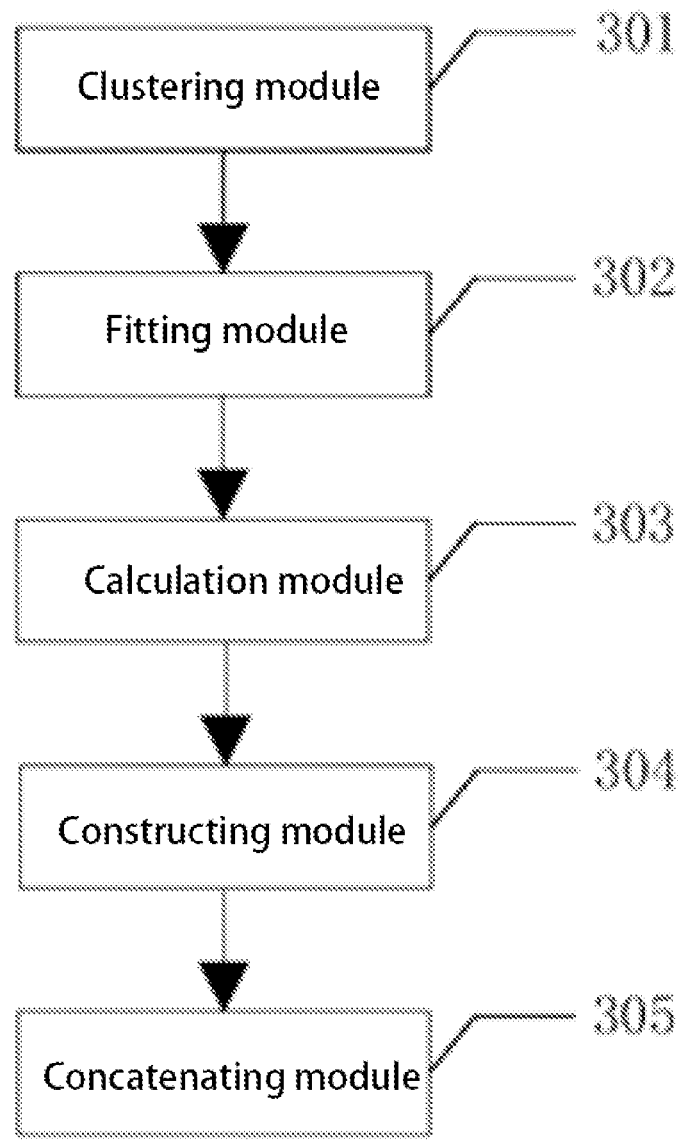
FIG. 3 illustrates a schematic diagram of a structure of a device for a generating wind turbine generator set simulation model provided by an embodiment of the present application.

Based on the same technical concept, the embodiment of the present application also provides a device for generating a wind turbine generator set simulation model. FIG. 3 shows a schematic diagram of a structure of the device for generating a wind turbine generator set simulation model provided by the embodiment of the present application, as shown in FIG. 3, the device including:

A clustering module 301, configured to cluster a plurality of pieces of historical operation data of the wind turbine generator set to obtain a predetermined number of target data sets; the wind speed contained in each piece of the historical operation data in the target data sets is within wind speed ranges corresponding to the target data sets; different target data sets correspond to different wind speed ranges; and the wind speed ranges corresponding to all the target data sets are continuous;

A fitting module 302, configured to train the initial simulation model for the pneumatic system, by using each of the target data set; and to fit the model parameters in the initial simulation model, so as to obtain a segmented pneumatic simulation model corresponding to each of the target data sets;

A calculation module 303, configured to calculate a hyperplane coefficient in a hyperplane inequality for any two adjacent wind speed ranges based on the two target data sets corresponding to the two adjacent wind speed ranges, where the two segmented pneumatic simulation models corresponding to each two adjacent wind speed ranges correspond to the hyperplane coefficient; and the hyperplane inequality constructed by the hyperplane coefficient is used to select a segmented pneumatic simulation model for use from the two segmented pneumatic simulation models corresponding to two adjacent wind speed ranges;

A constructing module 304, configured to construct a transmission generation simulation model for the transmission system and the generator system based on the historical operation data; and A concatenating module 305, configured to concatenate the segmented pneumatic simulation model corresponding to the wind speed range and the transmission generation simulation model for each of the wind speed ranges so as to acquire the wind turbine generator set simulation model corresponding to the wind speed range.

Optionally, the historical operation data further includes: a wind turbine rotation speed, a generator rotation speed, a pitch angle and a wind turbine pneumatic torque; when the clustering module 301 is configured to cluster the plurality of pieces of historical operation data of the wind turbine generator set to obtain a predetermined number of target data sets, it is specifically configured to:

Based on the calculation formula of a finite difference regression vector, determine the finite difference regression vector corresponding to each piece of the historical operation data, and determine data points corresponding to the historical operation data based on the finite difference regression vector and the wind turbine pneumatic torque; the calculation formula of the finite difference regression vector is:

$$x(t)=[y^T(t-1)y^T(t-2) \ldots y^T(t-n)u^T(t-1)u^T(t-2) \ldots u^T(t-n)]$$

Where t represents a generation time of the historical operation data; x(t) is the finite difference regression vector corresponding to a time t; y represents the wind turbine pneumatic torque; u represents the wind speed, the rotor speed, the generator rotation speed and the pitch angle; $n^a$ represents a first delay order of the wind speed, the rotor speed, the generator rotation speed and the pitch angle; and $n_b$ means a second delay order of the wind turbine pneumatic torque;

Divide the plurality of pieces of historical operation data according to the Euclidean distance between any two data points to obtain a plurality of initial data sets;

Calculate a parameter vector for each of the initial data sets using the least squares method;

Determine a mean value of the finite difference regression vector corresponding to each piece of the historical operation data in each of the initial data sets;

Generate a eigenvector corresponding to the initial data set for each initial data set according to the mean value and the parameter vector corresponding to the initial data set;

Calculate an empirical covariance matrix for each of the eigenvectors, and separately calculate a dispersion matrix used to represent the dispersion of each of the initial data sets;

Determine a confidence degree of the eigenvector according to the empirical covariance matrix and the dispersion matrix corresponding to the eigenvector; and Using the K-means clustering algorithm, based on the confidence, the dispersion matrix and the empirical covariance matrix corresponding to each eigenvector, cluster a plurality of the eigenvectors according to the clustering result of the eigenvector, to determine the clustering result of the historical operation data, so as to obtain the predetermined number of target data sets.

Optionally, the wind turbine generator set is a double-wind turbine, generator set and the pneumatic system includes a first wind turbine and a second wind turbine; the segmented pneumatic simulation model is:

$$y(t) = \begin{bmatrix} y_1(t) \\ y_2(t) \end{bmatrix} = \begin{cases} \cdots \\ \begin{bmatrix} \mu_{1,i}^T \\ \mu_{2,i}^T \end{bmatrix} \begin{bmatrix} x(t) \\ 1 \end{bmatrix} \\ \cdots \end{cases}$$

Where i represents the $i^{th}$ segmented pneumatic simulation model, y(t) represents the wind turbine pneumatic torque in the historical operation data corresponding to the time t, and $y_1(t)$ represents the wind turbine pneumatic torque of the first wind turbine, $y_2(t)$ represents the wind turbine pneumatic torque of the second wind turbine, $\mu_{1,i}$ represents model parameters corresponding to the pneumatic torque of the first wind turbine of the it segmented pneumatic simulation model, $\mu_{2,i}$ represents model parameters corresponding to the wind turbine pneumatic torque of the second wind turbine of the $i^{th}$ segmented pneumatic simulation model, and x(t) represents the finite difference regression vector corresponding to the historical operation data corresponding to the time t.

Optionally, the calculation module 303 is configured to calculate the hyperplane coefficient in the hyperplane inequality for any two adjacent wind speed ranges based on the two target data sets corresponding to the two adjacent wind speed ranges, and the calculating module is specifically configured to:

Calculate the hyperplane coefficient in the hyperplane inequality by the following equation:

$$\min\left(\frac{1}{2}\varphi^T\varphi + \gamma\sum_{k=1}^{m}\xi_k\right)$$

A constraint condition is:

$$b_k(\varphi^T x_k + d) \geq 1 - \xi_k, \xi_k \geq 0, k = 1, 2, \ldots, m$$

Where ψ is a normal vector, d is an offset, and the hyperplane coefficient includes the normal vector and the offset; γ represents a penalty coefficient; $\xi_k$ represents a slack variable; m represents the number of historical operation data contained in the two target data sets corresponding to the two adjacent wind speed ranges; $x_k$ represents a finite difference regression vector corresponding to the $k^{th}$ historical operation data in the two target data sets corresponding to the two adjacent wind speed ranges; and $b_k$ represents a data set label of the target data set to which the $k^{th}$ historical operation data belongs.

Optionally, the historical operation data further includes: a generator electromagnetic torque, and the transmission simulation model for the transmission system is:

$$\begin{cases} T_r = J_r \omega_r + T_{shaft} \\ T_{shaft} = A_{stif}\left(\delta_r - \frac{\delta_g}{N}\right) + B_{damp}\left(\omega_r - \frac{\omega_g}{N}\right) \\ -T_g = J_g \omega_g - \frac{T_{shaft}}{N} \end{cases}$$

Where $T_r$ represents a wind turbine pneumatic torque, $T_g$ represents a generator electromagnetic torque, or represents a wind turbine rotation speed, $\omega_g$ represents a generator rotation speed, $T_{shaft}$ represents an equivalent intermediate shaft torque, $J_r$ represents a wind turbine rotational inertia, $J_g$ represents a generator rotational inertia, $\delta_r$ is a wind turbine angular displacement, $\delta_g$ is an angular displacement of the generator, $d(\delta_r)/dt=\omega_r$, $d(\delta_g)/dt=\omega_g$, N represents a transmission ratio of a gearbox in the transmission system, $A_{stif}$ represents an equivalent stiffness coefficient of an intermediate shaft, and $B_{damp}$ represents an equivalent damping coefficient of the intermediate shaft;

The generation simulation model for the generator system is:

$$\dot{T}_g = \frac{1}{\tau_g}(T_g^* - T_g)$$

Where $T_g^*$ is a generator electromagnetic torque reference value, $\tau_g$ is an equivalent time constant, and $T_g$ is the generator electromagnetic torque;

The transmission generation simulation model is:

$$\begin{pmatrix} \dot{\omega}_r \\ \dot{\omega}_g \\ \dot{\delta}_p \\ \dot{T}_g \end{pmatrix} = \begin{bmatrix} -\frac{B_{damp}}{J_r} & \frac{B_{damp}}{J_r N} & -\frac{A_{stif}}{J_r} & \frac{1}{J_r} \\ \frac{B_{damp}}{J_g N} & -\frac{B_{damp}}{J_g N^2} & \frac{A_{stif}}{J_g N} & 0 \\ 1 & -\frac{1}{N} & 0 & 0 \\ 0 & 0 & 0 & -\frac{1}{\tau_g} \end{bmatrix} \begin{pmatrix} \omega_r \\ \omega_g \\ \delta_p \\ T_g \end{pmatrix} +$$

$$\begin{bmatrix} \frac{1}{J_r} & 0 & 0 \\ 0 & -\frac{1}{J_g} & 0 \\ 0 & 0 & 0 \\ 0 & 0 & \frac{1}{\tau_g} \end{bmatrix} \begin{pmatrix} T_r \\ T_g \\ T_g^* \end{pmatrix}$$

$$\begin{pmatrix} \omega_r \\ T_{shaft} \end{pmatrix} = \begin{bmatrix} 1 & 0 & 0 & 0 \\ B_{damp} & -\frac{B_{damp}}{N} & A_{stif} & 0 \end{bmatrix} \begin{pmatrix} \omega_r \\ \omega_g \\ \delta_p \\ T_g \end{pmatrix}$$

$$\delta_p = \delta_r - \frac{\delta_g}{N}$$

The wind turbine generator set simulation model is:

$$M_i: \begin{cases} h(t+1) = Dh(t) + Hs(t) \\ f(t) = Rh(t) + Gs(t) \end{cases}$$

$$D = \begin{bmatrix} -\frac{B_{damp}}{J_r} & \frac{B_{damp}}{J_r N} & -\frac{A_{stif}}{J_r} & \frac{\alpha_1}{J_r} \\ \frac{B_{damp}}{J_g N} & -\frac{B_{damp}}{J_g N^2} & \frac{A_{stif}}{J_g N} & 0 \\ 1 & -\frac{1}{N} & 0 & 0 \\ 0 & 0 & 0 & -\frac{1}{\tau_g} \end{bmatrix}$$

$$H = \begin{bmatrix} \frac{\alpha_2}{J_r} & \frac{\alpha_3}{J_r} & \frac{\alpha_4}{J_r} & \frac{\alpha_5}{J_r} & \frac{\alpha_6}{J_r} & \frac{\alpha_7}{J_r} & \frac{\alpha_8}{J_r} & \frac{\alpha_9}{J_r} & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & \frac{1}{\tau_g} \end{bmatrix}$$

$$R = \begin{bmatrix} 1 & 0 & 0 & 0 \\ B_{damp} & -\frac{B_{damp}}{N} & A_{stif} & 0 \end{bmatrix}$$

Where $M_i$ represents the $i^{th}$ wind turbine generator set simulation model; h(t) represents the wind speed, the wind turbine rotation speed, the generator rotation speed, the generator electromagnetic torque and δp at the time t, s(t) represents the wind speed, the wind turbine rotation speed, the generator rotation speed, the pitch angle and the generator electromagnetic torque reference value corresponding to the third delay order at the time t, f(t) represents the wind turbine rotation speed and the equivalent intermediate shaft torque at the time t; and $\alpha_1$-$\alpha_9$ represents the model parameters of the wind turbine generator set simulation model; G=0.

Optionally, the device further includes:

A first acquisition module, configured to acquire the first current wind turbine rotation speed of the wind turbine generator set simulation model during simulation run after the concatenating module obtains the wind turbine generator set simulation model corresponding to each of the wind speed ranges;

A judgment module, configured to judge whether the first current wind turbine rotation speed is greater than the predetermined wind turbine rotation speed, and to query the first target generator electromagnetic torque corresponding to the first current wind turbine rotation speed from the predetermined speed and torque curve table;

A first adjustment module, configured to adjust the pitch angle of the wind turbine generator set simulation model based on the target generator electromagnetic torque when the first current wind turbine rotation speed is greater than the predetermined wind turbine rotation speed, so as to remain the current generator electromagnetic torque of the wind turbine generator set simulation model within an allowable variation range of a rated generator electromagnetic torque; and A second adjustment module, configured to adjust the pitch angle of the wind turbine generator set simulation model based on the target generator electromagnetic torque when the first current wind turbine rotation speed is less than or equal to the predetermined wind turbine rotation speed, so that the current generator electromagnetic torque of the wind turbine generator set simulation model reaches the target generator electromagnetic torque; and the target generator electromagnetic torque is less than the rated generator electromagnetic torque.

Optionally, the device further includes:

A second acquisition module, configured to acquire the current wind speed at the current time, the second current wind turbine rotation speed, the current generator rotation speed, the current pitch angle, and the current generator electromagnetic torque of the wind turbine generator set simulation model during simulation run after the concatenating module obtains the wind turbine generator set simulation model corresponding to each of the wind speed ranges;

A query module, configured to query the second target generator electromagnetic torque corresponding to the second current wind turbine rotation speed from the rotation speed and torque curve table; and A prediction module, configured to predict the generator electromagnetic torque of the wind turbine generator set simulation model at the next time after the current time based on the second target generator electromagnetic torque, the current wind speed at the current time, the second current wind turbine rotation speed, the current generator rotation speed, the current pitch angle, and the current generator electromagnetic torque.

Embodiment III

Figure 4:
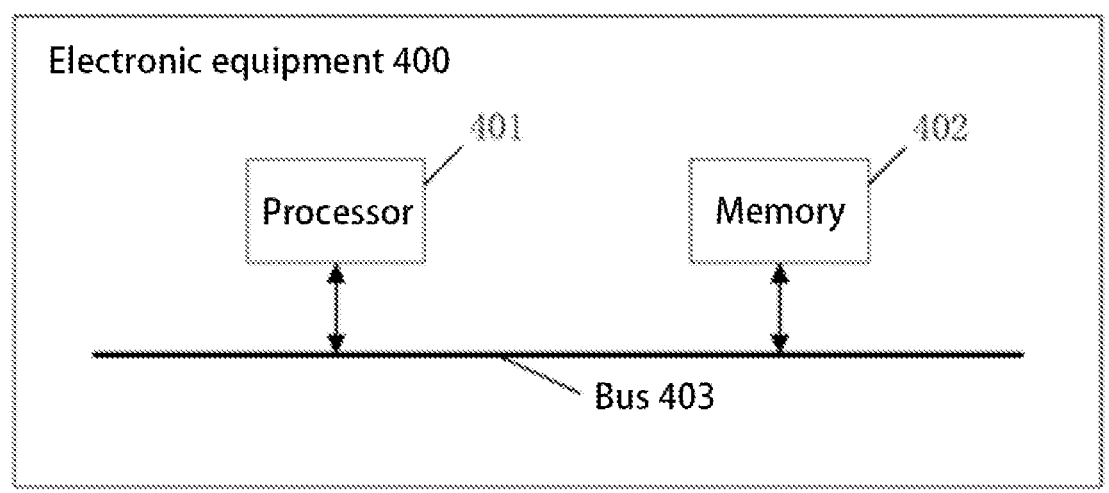
FIG. 4 illustrates a schematic structure of electronic equipment provided by an embodiment of the present application.

Based on the same technical concept, the embodiment of the present application also provides electronic equipment. FIG. 4 shows a schematic diagram of a structure of the electronic equipment provided by the embodiment of the present application. As shown in FIG. 4, the electronic equipment 400 includes: a processor 401, a memory 402 and a bus 403. The memory stores machine-readable instructions that can be executed by the processor. When the electronic equipment runs, the processor 401 and the memory 402 communicate through the bus 403, and the processor 401 executes the machine-readable instructions, to perform the method steps described in Embodiment I.

Embodiment IV

Based on the same technical concept, the Embodiment IV of the present application also provides a computer-readable storage medium. A computer program is stored therein. When run by the processor, the computer program performs the steps of the method in the embodiment I.

Those skilled in the art can clearly understand that for the convenience and simplicity of description, the specific working processes of the above-described devices, electronic equipment and computer-readable storage media can be referred to the corresponding processes in the foregoing method embodiments, which will not be repeatedly described here.

In the several embodiments provided in the present application, it should be understood that the disclosed devices and methods can be implemented in other ways. The device embodiments described above are only illustrative. For example, the division of the modules is only a logical function division. In actual implementations, there may be other division methods. For example, a plurality of units or components may be combined or can be integrated into another system, or some features can be ignored, or not implemented. On the other hand, the coupling or direct coupling or communication connection between each other shown or discussed may be through some communication interfaces, and the indirect coupling or communication connection of the devices or units may be in electrical, mechanical or other forms.

The units described as separate components may or may not be physically separated, and the components shown as units may or may not be physical units, that is, they may be located in one place, or they may be distributed to a plurality of network units. Some or all of the units can be selected according to actual needs to achieve the object of the solution of this embodiment.

In addition, each functional unit in various embodiments of the present application can be integrated into one processing unit, or each unit can exist physically alone, or two or more units can be integrated into one unit.

If the functions are implemented in the form of software functional units and sold or used as independent products, they can be stored in a non-volatile computer-readable storage medium that is executable by the processor. Based on this understanding, the technical solution of the present application is essentially embodied or the part that contributes to the existing technology or the part of the technical solution can be embodied in the form of a software product. The computer software product is stored in a storage medium, including several instructions used to cause a computer device (which may be a personal computer, a server, or a network device, etc.) to execute all or part of the steps of the methods described in various embodiments of the present application. The aforementioned storage media include: a U disk, a mobile hard disk, a read-only memory (Read-Only Memory, ROM), a random access memory (Random Access Memory, RAM), a magnetic disk or an optical disk and other media that can store a program code.

It should be finally noted that the above-mentioned embodiments are only specific implementation modes of the present application and are used to illustrate the technical solution of the present application rather than limiting the present application, and the protection scope of the present application is not limited thereto. Although the present application has been described in detail with reference to the foregoing embodiments, those of ordinary skill in the art should understand that those familiar with the technical field can still modify or easily think of changes to the technical solutions recorded in the foregoing embodiments within the technical scope disclosed in the present application, or make equivalent substitutions for some of the technical features. However, these modifications, changes or substitutions do not cause the essence of the corresponding technical solution to deviate from the spirit and scope of the technical solution of the embodiments of the present application, and they should all be covered by the protection scope of the present application. Therefore, the protection scope of the present application should be subject to the protection scope of the claims.

The invention claimed is:

1. A method for generating a wind turbine generator set simulation model, wherein the wind turbine generator set comprises: a pneumatic system with a wind turbine, a transmission system and a generator system; and the method comprises:

clustering a plurality of pieces of historical operation data of the wind turbine generator set, so as to obtain a predetermined number of target data sets, wherein wind speeds contained in each piece of the historical operation data in a target data set fall within a wind speed range corresponding to the target data set; different target data sets correspond to different wind speed ranges; the wind speed ranges corresponding to all the target data sets are continuous;

training the initial simulation model for the pneumatic system by using each of the target data sets, and fitting the model parameters in the initial simulation model, so as to obtain a segmented pneumatic simulation model corresponding to each of the target data sets;

calculating a hyperplane coefficient in the hyperplane inequality for any two adjacent wind speed ranges based on the two target data sets corresponding to the two adjacent wind speed ranges, wherein the two segmented pneumatic simulation models corresponding to each two adjacent wind speed ranges correspond to the hyperplane coefficient; and the hyperplane inequality constructed by the hyperplane coefficient is used to select a segmented pneumatic simulation model for use from the two segmented pneumatic simulation models corresponding to two adjacent wind speed ranges;

constructing a transmission generation simulation model for the transmission system and the generator system based on the historical operation data; and concatenating a segmented pneumatic simulation model corresponding to each wind speed range and the transmission generation simulation model, so as to obtain a wind turbine generator set simulation model, corresponding to the each wind speed range.

2. The method according to claim 1, wherein the historical operation data further comprises: a wind turbine rotation speed, a generator rotation speed, a pitch angle and a wind turbine pneumatic torque; the step of clustering a plurality of pieces of historical operation data of the wind turbine generator set to obtain a predetermined number of target data sets comprising:

determining the finite difference regression vector corresponding to each piece of the historical operation data based on a calculation formula of a finite difference regression vector, and determining data points corresponding to the historical operation data based on the finite difference regression vector and the wind turbine pneumatic torque; the calculation formula of the finite difference regression vector is:

$$x(t) = [y^T(t-1)y^T(t-2) \ldots y^T(t-n)u^T(t-1)u^T(t-2) \ldots u^T(t-n)]$$

where t represents a generation time of the historical operation data; x(t) is a finite difference regression vector corresponding to a time t; y represents a wind turbine pneumatic torque; u represents the wind speed, the rotor speed, the generator rotation speed and the pitch angle; $n_a$ represents a first delay order of the wind speed, the rotor speed, the generator rotation speed and the pitch angle; $n_b$ represents a second delay order of the wind turbine pneumatic torque;

dividing the plurality of pieces of historical operation data according to the Euclidean distance between any two data points to obtain a plurality of initial data sets;

calculating a parameter vector for each of the initial data sets using the least squares method;

determining a mean value of the finite difference regression vector corresponding to each piece of the historical operation data in each of the initial data sets;

generating a feature vector corresponding to the initial data set for each initial data set according to the mean value and the parameter vector corresponding to the initial data set;

calculating an empirical covariance matrix for each of the feature vectors, and separately calculating a dispersion matrix configured to represent the dispersion of each of the initial data sets;

determining a confidence degree of an eigenvector according to the empirical covariance matrix and the dispersion matrix corresponding to the eigenvector;

clustering the plurality of the feature vectors using a K-means clustering algorithm based on the confidence degree, the dispersion matrix and the empirical covariance matrix corresponding to each feature vector, to determine a clustering result of the historical operation data according to the clustering result of the feature vectors to obtain the predetermined number of target data sets.

3. The method according to claim 2, wherein the wind turbine generator set is a double-wind turbine generator set, and the pneumatic system comprises a first wind turbine and a second wind turbine; the segmented pneumatic simulation model is:

$$y(t) = \begin{bmatrix} y_1(t) \\ y_2(t) \end{bmatrix} = \begin{cases} \cdots \\ \begin{bmatrix} \mu_{1,i}^T \\ \mu_{2,i}^T \end{bmatrix} \begin{bmatrix} x(t) \\ 1 \end{bmatrix} \\ \cdots \end{cases}$$

where i represents the $i^{th}$ segmented pneumatic simulation model, y(t) represents a wind turbine pneumatic torque in the historical operation data corresponding to the time t, and $y_1(t)$ represents an pneumatic torque of the first wind turbine, $y_2(t)$ represents a wind turbine pneumatic torque of the second wind turbine, $\mu_{1,i}$ represents model parameters corresponding to the pneumatic torque of the first wind turbine of the $i^{th}$ segmented pneumatic simulation model, $\mu_{2,i}$ represents model parameters corresponding to the wind turbine pneumatic torque of the second wind turbine of the $i^{th}$ segmented pneumatic simulation model, and x(t) represents a finite difference regression vector corresponding to the historical operation data corresponding to the time t.

4. The method according to claim 2, wherein the step of calculating the hyperplane coefficient in the hyperplane inequality for any two adjacent wind speed ranges based on the two target data sets corresponding to the two adjacent wind speed ranges comprises:

calculating the hyperplane coefficient in the hyperplane inequality by the following equation:

$$\min\left(\frac{1}{2}\varphi^T\varphi + \gamma\sum_{k=1}^{m}\xi_k\right)$$

a constraint conditions is:

$$b_k(\varphi^T x_k + d) \geq 1 - \xi_k, \xi_k \geq 0, k = 1, 2, \ldots, m$$

where $\psi$ is a normal vector, d is an offset, and the hyperplane coefficient comprises the normal vector and the offset; $\gamma$ represents a penalty coefficient; $\xi_k$ represents a slack variable; m represents the number of historical operation data contained in the two target data sets corresponding to the two adjacent wind speed ranges; $x_k$ represents a finite difference regression vector corresponding to the $k^{th}$ historical operation data in two target data sets corresponding to two adjacent wind speed ranges; $b_k$ represents a data set label of the target data set to which the $k^{th}$ historical operation data belongs.

5. The method according to claim 2, wherein the historical operation data further comprises: a generator electromagnetic torque, the transmission simulation model for the transmission system being:

$$\begin{cases} T_r = J_r \omega_r + T_{shaft} \\ T_{shaft} = A_{stif}\left(\delta_r - \dfrac{\delta_g}{N}\right) + B_{damp}\left(\omega_r - \dfrac{\omega_g}{N}\right) \\ -T_g = J_g \omega_g - \dfrac{T_{shaft}}{N} \end{cases}$$

where $T_r$ represents a wind turbine pneumatic torque, $T_g$ represents a generator electromagnetic torque, $\omega_r$ represents a wind turbine rotation speed, $\omega_g$ represents a generator rotation speed, $T_{shaft}$ represents an equivalent intermediate shaft torque, $J_r$ represents a wind turbine rotational inertia, and $J_g$ represents a generator rotational inertia, $\delta_r$ is a wind turbine angular displacement, $\delta_g$ is an angular displacement of the generator, $d(\delta_r)/dt = \omega_r$, $d(\delta_g)/dt = \omega_g$, N represents a transmission ratio of a gearbox in the transmission system, and $A_{stif}$ represents an equivalent stiffness coefficient of an intermediate shaft, $B_{damp}$ represents an equivalent damping coefficient of the intermediate shaft;

the generation simulation model for the generator system is:

$$\dot{T}_g = \dfrac{1}{\tau_g}(T_g^* - T_g)$$

where $T_g^*$ is a generator electromagnetic torque reference value, $\tau_g$ is an equivalent time constant, and $T_g$ is the generator electromagnetic torque;

the transmission generation simulation model is:

$$\begin{pmatrix} \dot{\omega}_r \\ \dot{\omega}_g \\ \dot{\delta}_p \\ \dot{T}_g \end{pmatrix} = \begin{bmatrix} \dfrac{-B_{damp}}{J_r} & \dfrac{B_{damp}}{J_r N} & -\dfrac{A_{stif}}{J_r} & \dfrac{1}{J_r} \\ \dfrac{B_{damp}}{J_g N} & \dfrac{-B_{damp}}{J_g N^2} & \dfrac{A_{stif}}{J_g N} & 0 \\ 1 & -\dfrac{1}{N} & 0 & 0 \\ 0 & 0 & 0 & -\dfrac{1}{\tau_g} \end{bmatrix} \begin{pmatrix} \omega_r \\ \omega_g \\ \delta_p \\ T_g \end{pmatrix} +$$

$$\begin{bmatrix} \dfrac{1}{J_r} & 0 & 0 \\ 0 & -\dfrac{1}{J_g} & 0 \\ 0 & 0 & 0 \\ 0 & 0 & \dfrac{1}{\tau_g} \end{bmatrix} \begin{pmatrix} T_r \\ T_g \\ T_g^* \end{pmatrix}$$

$$\begin{pmatrix} \omega_r \\ T_{shaft} \end{pmatrix} = \begin{bmatrix} 1 & 0 & 0 & 0 \\ B_{damp} & \dfrac{-B_{damp}}{N} & A_{stif} & 0 \end{bmatrix} \begin{pmatrix} \omega_r \\ \omega_g \\ \delta_p \\ T_g \end{pmatrix}$$

$$\delta_p = \delta_r - \dfrac{\delta_g}{N}$$

the wind turbine generator set simulation model is:

$$M_i: \begin{cases} h(t+1) = Dh(t) + Hs(t) \\ f(t) = Rh(t) + Gs(t) \end{cases}$$

$$D = \begin{bmatrix} \dfrac{-B_{damp}}{J_r} & \dfrac{B_{damp}}{J_r N} & -\dfrac{A_{stif}}{J_r} & \dfrac{\alpha_1}{J_r} \\ \dfrac{B_{damp}}{J_g N} & \dfrac{-B_{damp}}{J_g N^2} & \dfrac{A_{stif}}{J_g N} & 0 \\ 1 & -\dfrac{1}{N} & 0 & 0 \\ 0 & 0 & 0 & -\dfrac{1}{\tau_g} \end{bmatrix}$$

$$H = \begin{bmatrix} \dfrac{\alpha_2}{J_r} & \dfrac{\alpha_3}{J_r} & \dfrac{\alpha_4}{J_r} & \dfrac{\alpha_5}{J_r} & \dfrac{\alpha_6}{J_r} & \dfrac{\alpha_7}{J_r} & \dfrac{\alpha_8}{J_r} & \dfrac{\alpha_9}{J_r} & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & \dfrac{1}{\tau_g} \end{bmatrix}$$

$$R = \begin{bmatrix} 1 & 0 & 0 & 0 \\ B_{damp} & \dfrac{-B_{damp}}{N} & A_{stif} & 0 \end{bmatrix}$$

where $M_i$ represents the $i^{th}$ wind turbine generator set simulation model; h(t) represents the wind speed, the wind turbine rotation speed, the generator rotation speed, the generator electromagnetic torque and $\delta_p$ at the time t, s(t) represents the wind speed, the wind turbine rotation speed, the generator rotation speed pitch angle, and the generator electromagnetic torque reference value corresponding to the third delay order at the time t, f(t) represents the wind turbine rotation speed and the equivalent intermediate shaft torque at the time t; and α1-α9 represents the model parameters of the wind turbine generator set simulation model; G=0.

6. The method according to claim 1, wherein after obtaining the wind turbine generator set simulation model corresponding to each of the wind speed ranges, the method further comprises:

acquiring the first current wind turbine rotation speed when the wind turbine generator set simulation model runs;

determining whether the first current wind turbine rotation speed is greater than the predetermined wind turbine rotation speed, and querying the first target generator electromagnetic torque corresponding to the first current wind turbine rotation speed from the predetermined speed and torque curve table;

when the first current wind turbine rotation speed is greater than the predetermined wind turbine rotation speed, adjusting the pitch angle of the wind turbine generator set simulation model based on the target generator electromagnetic torque, so that the current generator electromagnetic torque of the wind turbine generator set simulation model is remained within an allowable variation range of a rated generator electromagnetic torque;

when the first current wind turbine rotation speed is less than or equal to the predetermined wind turbine rotation speed, based on the target generator electromagnetic torque, adjusting the pitch angle of the wind turbine generator set simulation model to 0, so that the current generator electromagnetic torque of the wind turbine generator set simulation model reaches the target generator electromagnetic torque; and the target generator electromagnetic torque is less than the rated generator electromagnetic torque.

7. The method according to claim 6, wherein after acquiring the wind turbine generator set simulation model corresponding to each of the wind speed ranges, the method further comprises:

acquiring the current wind speed, the second current wind turbine rotation speed, the current generator rotation speed, the current pitch angle, and the current generator electromagnetic torque at the current time when the wind turbine generator set simulation model runs;

querying the second target generator electromagnetic torque corresponding to the second current wind turbine rotation speed from the rotation speed and torque curve table;

predicting the generator electromagnetic torque of the wind turbine generator set simulation model at the next time after the current time based on the second target generator electromagnetic torque, the current wind speed at the current time, the second current wind turbine rotation speed, the current generator rotation speed, the current pitch angle, and the current generator electromagnetic torque.

8. Electronic equipment, comprising: a processor, a memory and a bus, wherein the memory stores machine-readable instructions executable by the processor, and the processor communicates with the memory via the bus when the electronic equipment is in operation, the machine-readable instructions, upon being executed by the processor, executing the steps of the method according to claim 1.

9. A non-transitory computer-readable storage medium, wherein a computer program is stored therein, when run by a processor, the computer program performing the steps of the method according to claim 1.

10. A device for generating a wind turbine generator set simulation model, wherein the wind turbine generator set comprises: a pneumatic system with a wind turbine, a transmission system and a generator system; and the device comprises:

a clustering module, configured to cluster a plurality of pieces of historical operation data of the wind turbine generator set to obtain a predetermined number of target data sets, wherein wind speeds contained in each piece of the historical operation data in a target data set fall within a wind speed range corresponding to the target data set; different target data sets correspond to different wind speed ranges; and the wind speed ranges corresponding to all the target data sets are continuous;

a fitting module, configured to train the initial simulation model for the pneumatic system by using each of the target data sets, and to fit the model parameters in the initial simulation model, so as to obtain a segmented pneumatic simulation model corresponding to each of the target data sets;

a calculation module configured to calculate a hyperplane coefficient in a hyperplane inequality for any two adjacent wind speed ranges based on the two target data sets corresponding to the two adjacent wind speed ranges wherein the two segmented pneumatic simulation models corresponding to each two adjacent wind speed ranges correspond to the hyperplane coefficient; and the hyperplane inequality constructed by the hyperplane coefficient is used to select a segmented pneumatic simulation model for use from the two segmented pneumatic simulation models corresponding to two adjacent wind speed ranges;

a constructing module, configured to construct a transmission generation simulation model for the transmission system and the generator system based on the historical operation data; and a concatenating module, configured to concatenate the pneumatic segmentation simulation model corresponding to each wind speed range and the transmission generation simulation model to obtain a wind turbine generator set simulation model corresponding to the each wind speed range.

* * * * *